United States Patent
Syed et al.

(10) Patent No.: US 12,470,777 B2
(45) Date of Patent: Nov. 11, 2025

(54) METHODS AND APPARATUSES FOR SELECTING CONTENT APPLICATIONS

(71) Applicant: Comcast Cable Communications, LLC, Philadelphia, PA (US)

(72) Inventors: Yasser Syed, San Francisco, CA (US); Stuart Kurkowski, Philadelphia, PA (US); Ali C. Begen, Philadelphia, PA (US); Alexander Giladi, Denver, CO (US); Dan Grois, Beer-Sheva (IL)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/628,150

(22) Filed: Apr. 5, 2024

(65) Prior Publication Data
US 2025/0317627 A1 Oct. 9, 2025

(51) Int. Cl.
*H04N 21/64* (2011.01)

(52) U.S. Cl.
CPC .................................. *H04N 21/64* (2013.01)

(58) Field of Classification Search
None
See application file for complete search history.

(56) References Cited

U.S. PATENT DOCUMENTS

| | | | |
|---|---|---|---|
| 9,804,668 B2 | 10/2017 | Thorwirth et al. | |
| 10,110,960 B2 | 10/2018 | Roberts et al. | |
| 2008/0271078 A1* | 10/2008 | Gossweiler | H04N 21/47 725/40 |
| 2009/0204639 A1* | 8/2009 | Barrett | H04N 21/23439 709/204 |
| 2010/0104269 A1* | 4/2010 | Prestenback | H04N 21/4331 386/334 |
| 2016/0255394 A1* | 9/2016 | Yang | H04N 21/4348 725/131 |
| 2016/0342844 A1* | 11/2016 | Kansara | H04N 21/6547 |
| 2017/0055025 A1* | 2/2017 | Lee | H04L 65/762 |
| 2017/0180825 A1* | 6/2017 | Lacivita | H04N 21/43074 |
| 2017/0223432 A1* | 8/2017 | Lee | H04N 7/015 |
| 2017/0264923 A1* | 9/2017 | Lacivita | G11B 27/10 |
| 2017/0272824 A1* | 9/2017 | Bunner | H04N 21/8586 |
| 2017/0332113 A1* | 11/2017 | Haritaoglu | H04N 21/8456 |
| 2017/0332117 A1* | 11/2017 | Haritaoglu | H04N 21/234363 |
| 2017/0353522 A1 | 12/2017 | Van Brandenburg et al. | |
| 2018/0026733 A1* | 1/2018 | Yang | H04N 21/235 725/33 |

(Continued)

FOREIGN PATENT DOCUMENTS

| | | | | |
|---|---|---|---|---|
| CA | 2938185 C | * | 3/2022 | ......... H04N 21/2362 |
| CA | 2924036 C | * | 8/2023 | ............. H04H 20/93 |

(Continued)

*Primary Examiner* — William J Kim
(74) *Attorney, Agent, or Firm* — Ballard Spahr LLP

(57) ABSTRACT

Methods, systems, apparatuses for selecting content applications are described. A manifest file associated with a channel may include content item identifiers associated with content items and content application identifiers associated with content applications that can play the content items. A computing device such as a set-top box may determine one or more content applications to play one or more content items based on the content item identifiers and the content application identifiers in the manifest file.

32 Claims, 10 Drawing Sheets

(56) References Cited

U.S. PATENT DOCUMENTS

| | | | | |
|---|---|---|---|---|
| 2018/0288453 | A1* | 10/2018 | Schmidt | H04L 65/613 |
| 2020/0068253 | A1* | 2/2020 | Kim | H04N 21/44008 |
| 2020/0304868 | A1* | 9/2020 | Ganjam | H04N 21/4425 |
| 2021/0211748 | A1* | 7/2021 | Terem | H04N 21/812 |
| 2021/0385522 | A1* | 12/2021 | Giladi | H04N 21/2362 |
| 2022/0138283 | A1* | 5/2022 | Kolev | H04L 63/10 |
| | | | | 726/26 |
| 2023/0154184 | A1* | 5/2023 | Frost | H04N 21/23418 |
| | | | | 382/100 |
| 2023/0370698 | A1* | 11/2023 | Pressnell | H04N 21/812 |
| 2024/0196049 | A1* | 6/2024 | Leigh | H04N 21/2541 |
| 2025/0097511 | A1* | 3/2025 | Lal | H04N 21/47202 |

FOREIGN PATENT DOCUMENTS

| | | | | |
|---|---|---|---|---|
| WO | WO-2014177929 A2 * | 11/2014 | | H04N 21/44226 |
| WO | WO-2016018041 A1 * | 2/2016 | | H04N 21/2343 |

* cited by examiner

METHODS AND APPARATUSES FOR SELECTING CONTENT APPLICATIONS

BACKGROUND

Free Ad-Supported Television (FAST) channels refer to television channels that are available to users at no cost. The FAST channels generate revenue through advertising. These FAST channels are typically delivered over-the-top (OTT) via the internet rather than traditional cable or satellite services. For example, users access content of the FAST channels by selecting hosted applications that are isolated from the main applications (e.g., main player applications) of user devices. However, without an awareness of the hosted applications providing the content of the FAST channels, the users may not access the hosted applications for additional content.

SUMMARY

It is to be understood that both the following general description and the following detailed description are exemplary and explanatory only and are not restrictive. Methods, systems, and apparatuses for selecting content applications are described. For example, a manifest file associated with a channel (e.g., a linear channel) may indicate content items and content applications that can provide the content item. Based on the manifest file, a computing device such as a set-top box, may determine a content application to provide the content item currently being output by the channel or reaching the endpoint on the channel, via the content application.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, show examples and together with the description, serve to explain the principles of the methods and systems.

DETAILED DESCRIPTION

Figure 1:
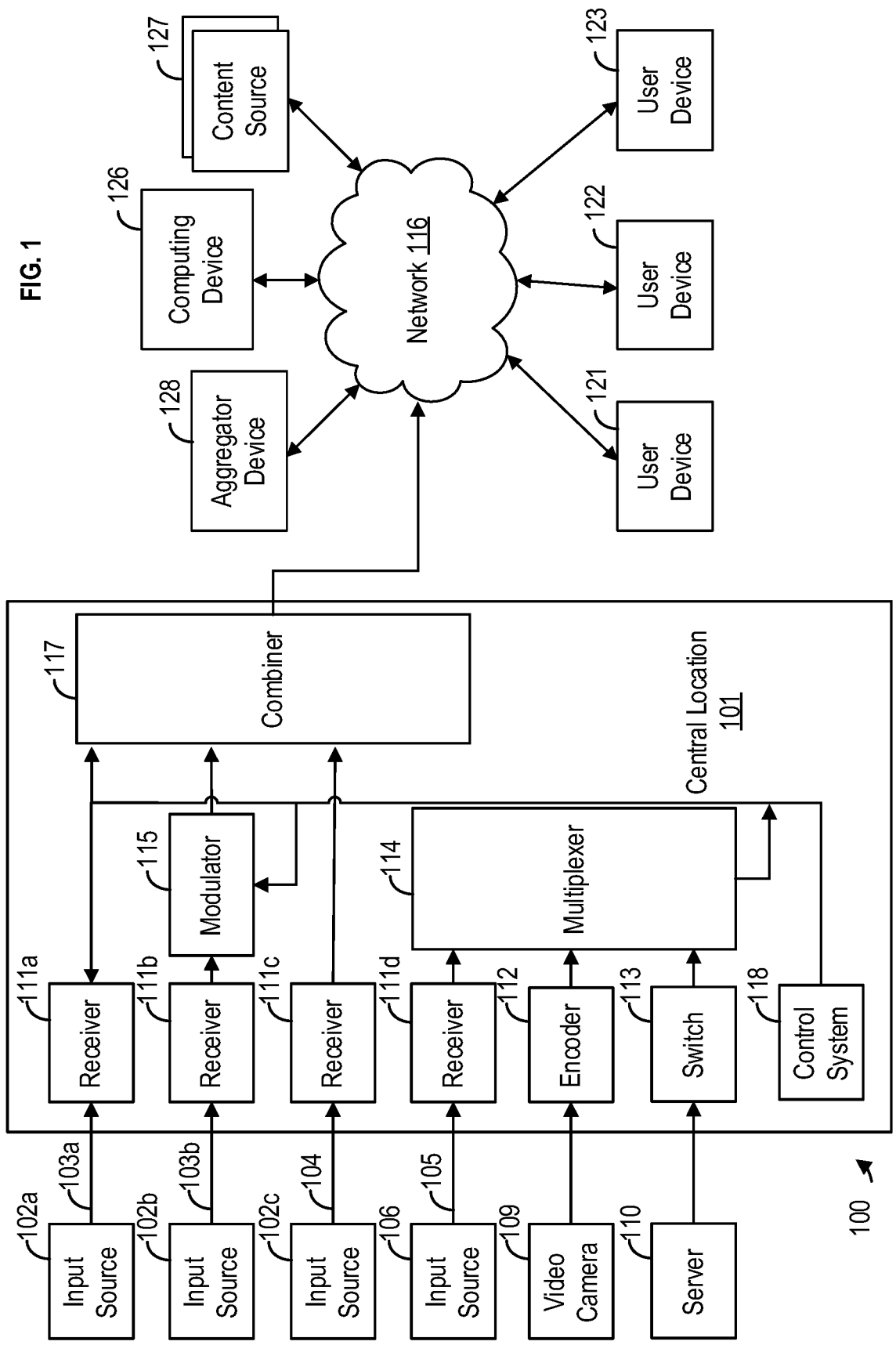
FIG. 1 shows an example system.

As used in the specification and the appended claims, the singular forms "a," "an," and "the" include plural referents unless the context clearly dictates otherwise.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

Described herein are methods, systems, and apparatuses for selecting content applications. For example, a manifest file associated with a channel (e.g., a linear channel) may deliver information to a computing device, such as a main video player, with instructions to stop, start, and launch content applications or video applications as needed. The manifest file may include content identifiers indicating content items and application identifiers indicating content applications that can play the content items. The content items that the content applications can play may be associated with various content providers. The term content application may be a software application that is isolated from the main application (e.g., a player application) of a device (e.g., a set-top box).

A computing device, such as a set-top box, may determine one or more content applications to provide or output one or more content items based on the manifest file. For example, the computing device may output an instruction or an option to select a content item that can be played by the content application associated with the content item. The instruction or option may include a playlist displayed via a graphic overlay on a user interface, such as a display device (e.g., a television or monitor). Based on the selection of the content item, the computing device may cause the content application to provide or output the selected content item. The content application may provide or output any portion of the selected content item, for example, based on the instruction or the option.

Additionally or alternatively, the instruction or option may include a playlist displayed via a user interface. The playlist may comprise one or more content items (e.g., video-on-demand (VOD) assets) where each content item is connected to a particular content application. The content items or the playlist may be displayed via a graphic overlay on the display device connected to the computing device. The user may select the content item, which will lead the user to the content application associated with the selected content item.

For example, a FAST channel may comprise different content items (e.g., VOD assets) stitched together from different content providers and originated from different content applications (e.g., Tubi, Plex, Xumo, YouTube, and FreeVee). The FAST channel may also include regular linear channels in a cable channel line-up. A user watches a video in the regular linear channel via the display device of the computing device, and may find a content item (e.g., a TV episode). The display device may show an option to select the content item through a graphic overlay or a user interface. The user may select the content item while the content item (e.g., the TV episode) is being played. While the content item (e.g., the TV episode) is played or after the content item (e.g., the TV episode) is completed (e.g., reaches an endpoint), the computing device (e.g., the main player application) may send the selection information to the content application that can provide or output the content item (e.g., the TV episode or TV episodes related to the TV episode the user was watching). The user may be directed to the content application and may open up the content application to view the content item (e.g., the TV episode or additional episodes related to the TV episode that the user was watching).

For example, the player application (e.g., the main player application of a computing device) communicating to the computing device (e.g., set-top box) or device application (e.g., Reference Design Kit (RDK)) may determine, based on the selection information, the content application that can provide or output the content item the user wants to watch.

Initially, through the linear channel associated with the content item (e.g., the TV episode), the channel and content application information can be signaled or delivered through the Dynamic Adaptive Streaming over HTTP (DASH) manifest file or HTTP Live Streaming (HLS) playlist. The DASH manifest file or the HLS playlist may indicate the channel and content application information as a Uniform Resource Identifier (URI), a supplemental property, a Society of Cable Telecommunications Engineers (SCTE) 35 message, and/or an event that can occur on a period level (or the level that indicates the content item in the linear channel). The selection information may be sent to the player application. The player application may indicate that a choice has been made through a selection process as the content item (e.g., the TV episode) is playing (e.g., similar to a selection process for fast forward (FWD)/rewind (RWD)/pause, etc.). The player application may then send a signal to the device application (e.g., RDK) to trigger the device to start the content application. If the transmitted signal includes some payload, such as a content item identifier identifying the content item or a series identifier, the content application may show the content item or additional content items (e.g., additional episodes of that content item, an additional TV episode, or the like).

A content application may comprise one or more of a streaming application, a content streaming application, a hosted application, a hosted streaming application, a device-hosted application, or any combination thereof. The content application may be a Free Ad-Supported Television (FAST) channel application such XumoPlay or a non-FAST channel application such as Netflix.

"Content item," as the phrase is used herein, may also be referred to as "content," "content data," "content information," "content asset," "multimedia item data file," or simply "data" or "information." Content items may be any information or data that may be licensed to one or more individuals (or other entities, such as businesses or groups). Content may be electronic representations of video, audio, text, and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content may include a movie, a television show, a TV episode, a VOD asset, a sporting event, a news broadcast, a program, a commercial, video, audio, games, applications, data, and/or the like. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

FIG. 1 shows an example system 100 that enables the selection of content applications for outputting a selected content item. Those skilled in the art will appreciate that digital equipment and/or analog equipment may be employed. One skilled in the art will appreciate that herein is a functional description and that the respective functions may be performed by software, hardware, or a combination of software and hardware.

The system 100 may include a central location 101 (e.g., a headend), which may receive content, data, and/or information from multiple sources. The central location 101 may combine the content from the various sources and may distribute the content to a user (e.g., subscriber) location and or user device (e.g., a content output device, a content/media player, a client device, a mobile device, a smart device, a set-top box, a smart TV, etc.) via a network 116 (e.g., a content distribution network, a content access system, etc.). The central location 101 may receive content from a variety of sources 102a-c. The content may be sent from any of the sources 102a-c to the central location 101 via a variety of transmission paths, including wireless paths (e.g., satellite paths 103a-b) and terrestrial paths 104. The central location 101 may also receive content from input 106, such as a direct feed source, via a direct line 105 (e.g., one or more communication links and/or one or more communication paths). Other input sources may be capture devices such as a video camera 109 or a server 110. The content sent by the content sources may comprise a single content item, a portion of a content item (e.g., content fragment), a content stream, a multiplex that includes several content items, and/or the like.

For example, the central location 101 may have one or a plurality of receivers 111a-d that are associated with one or more corresponding input sources. The central location 101 may include one or more encoders 112, switches 113, multiplexers, and/or the like. An encoder 112 may compress, encrypt, transform, and/or otherwise encode content. The encoder 112 may encode content based on one or more compression standards, such as MPEG. The encoder may receive content from a video camera 109 and/or other source and apply one or more encoding algorithms to the received content. A switch 113 may enable access to a server 110, which may be a Pay-Per-View server, a data server, an internet router, a network system, a phone system, and the like. Some signals may require additional processing, such as signal multiplexing, before being modulated. Such multiplexing may be performed by a multiplexer 114.

The central location 101 may include one or more modulators 115 for interfacing with a network 116. A modulator may receive content from a receiver 111, encoder 112, multiplexer 114, and/or the like. A modulator 115 may convert the received content into a modulated output signal suitable for transmission over the network 116. A modulator 115 may map portions of the content to data bits expressed as signals (e.g., sinusoidal signals) at corresponding subcarrier frequencies of a data symbol. The output signals from the modulator 115 may be combined (e.g., packaged), using equipment such as a combiner 117 (e.g., a packaging device), for input into the network 116.

The network 116, and the system 100 generally, may be a content distribution network, a content access network, and/or the like. The network 116 may be configured to send content from a variety of sources using a variety of network paths, protocols, devices, and/or the like. The network 116 may be managed (e.g., deployed, serviced) by a content provider, a service provider, and/or the like. The network 116 may have a plurality of communication links connecting a plurality of devices.

The functions and performance of system 100 may be monitored and controlled, for example, via a control system 118 and/or an associated device. For example, the control system 118 may interface, monitor, and/or control a variety of functions, including, but not limited to, the channel lineup for a television system, billing for each user, conditional access for content distributed to users, and the like. The control system 118 may send input to the modulators 115 for setting operating parameters, such as system specific MPEG table packet organization or conditional access information. The control system 118 may be located at the central location 101 or at a remote location.

Signals may be sent, transmitted, distributed, and/or the like from the central location 101 to user locations and/or user devices 121, 122, 123 (e.g., content/media players, client devices, mobile devices, smart devices, set-top boxes, smart TVs, etc.), for example, via the network 116. The network 116 may be, for example, an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

The system 100 may include one or more content sources 127. The content source 127 may be configured to send content to the user device 121, 122, 123. The content source 127 may be configured to send streaming media, such as on-demand content, content recordings, and/or the like. The content source 127 may be managed by third-party content providers, service providers, online content providers, over-the-top content providers, and/or the like. The content may be available via a subscription, by individual item purchase or rental, and/or the like. The content source 127 may be configured to send the content via a packet-switched network path, such as via an internet protocol (IP) based connection. The content may be accessed by users and/or the user devices 121, 122, 123 via applications, such as mobile applications, television applications, set-top box applications, player applications, hosted applications, gaming device applications, and/or the like. An application may be a custom application (e.g., by a content provider, for a specific device), a general content browser (e.g., a web browser), an electronic program guide, and/or the like.

The system 100 may include a computing device 126 (e.g., a transcoder/packager, a server, etc.). The computing device 126 may receive requested content items (e.g., videos, video/audio assets, movies, programs, shows, etc.) from the content source 127 and send the requested content items downstream to an aggregator device 128 which may, in turn, send the content items to the user device 121, 122, 123.

Bitrate conversion, coder/decoder (CODEC) conversion, frame size conversion, and/or the like may be performed, for example, by/via the computing device 126. For example, the computing device 126 may receive a content item from the content source 127 and transcode the content item to generate one or more transcoded streams, such as a live stream, a video-on-demand (VOD) stream, and/or the like. One or more transcoded streams may correspond to a different adaptive bitrate (ABR) representation of a content item. For example, transcoded streams may differ from each other with respect to one or more of audio bitrate, number/quantity of audio channels, audio CODEC, video bitrate, video frame size, video CODEC, etc.

The one or more transcoded streams may be made available to the user device 121, 122, 123 for adaptive streaming and/or download. For example, a single high bitrate source content item may be used to generate one or more representations of the content item that have lower bitrates and/or alternative CODECs on-the-fly. As an example, a CODEC switch from an H.264/advanced audio coding (AAC) input stream to a VP8 representation and a Vorbis representation may be performed. For example, audio formats may be switched from a surround sound format to a stereo format. The computing device 126 may transcode the content items such that key frames (e.g., intra-coded frames (I-frames)) in each of the transcoded content items occur at the same time as in the source content item. That is, each of the transcoded content items may be "key frame aligned" to enable seamless switching between different ABR representations by a destination device (e.g., the user device 121-123, etc.).

Packaging and segmentation of transcoded content items may be performed, for example, by/via the computing device 126. For example, the computing device 126 may divide a set of ABR representations (e.g., transcoded content items) into media segments. For example, the computing device 126 may determine/receive a target segment duration. The target duration may be, for example, approximately ten thousand milliseconds. The target segment duration may be received, for example, via user input or a configuration file. Alternately, the target segment duration may be dynamically determined based on properties of the source content item, the computing device 126, etc. For example, if the target segment duration is ten seconds, the computing device 126 may break transcoded content items into segments at key frame boundaries approximately ten seconds apart. Further, if the transcoded content items include separate video and audio streams, the computing device 126 may generate the segments such that the video and audio streams are timecode aligned.

Multiple content segmentation types may be supported and segments may be generated accordingly, for example, by/via the computing device 126. Segments may alternately be referred to as "chunks." The computing device 126 may support both multiplexed segments (video and audio data included in a single multiplexed stream) and non-multiplexed segments (video and audio data included in separate non-multiplexed streams). Further, in the case of MPEG-DASH, the computing device 126 may be configured to support container formats in compliance with international standards organization base media file format (ISOBMFF and any extensible file format, etc.), motion picture experts group 2 transport stream (MPEG-TS), extensible binary markup language (EBML), WebM, Matroska, or any combination thereof. The computing device 126 may be, for example, configured to employ a "smart" storage system to avoid replicating audio/video data when generating segments for each content segmentation type. For example, if the computing device 126 supports N content segmentation types (where N is an integer greater than zero), the computing device 126 may generate N segment templates for each segment (e.g., ten-second portion) of each transcoded content item. Each segment template may comprise header information associated with a content segmentation type, data indicating a start position or start time of the segment in the source content item, and data indicating an end position or end time of the segment in the source content item. Thus, in the case of MPEG-DASH, different segment templates may be generated for ISOBMFF multiplexed ("muxed"), ISOBMFF non-multiplexed ("demuxed"), MPEG-TS muxed, MPEG-TS demuxed, EBML muxed, EBML demuxed, etc. In an embodiment, each of the segment templates may not include the underlying audio/video data of the corresponding segment. Thus, even though multiple segment templates may be generated for each segment of the source content item, the underlying segment audio/video data may be stored once. As the segment templates are generated, the computing device 126 may generate and use segment information regarding the segment templates to format a content item reference file and/or resource locators, such as a playlist, a manifest file, a media presentation description (MPD) file, and/or the like.

A content item reference file and/or information may identify one or more segments of one or more adaptive streaming representations of a source content item. For example, transcoded content items generated by the computing device 126 may include three ABR representations of a source content item: a first representation with a bitrate of 2 megabits per second (Mbps) and a frame size of 720p, a second representation with a bitrate of 750 kilobits per second (Kbps) and a frame size of 360p, and a third representation with a bitrate of 250 kbps and a frame size of 120p. More, fewer, and/or different adaptive streaming representations may be generated by the computing device 126, where each generated adaptive streaming representation(s) has a plurality of key frame aligned segments. The computing device 126 may generate content item reference files and/or information based on the segment information, including information regarding the segment(s) of the adaptive streaming representation(s) that are generated. Different content item reference files and/or information may be generated for each of the user devices 121-123 that requests a content item reference file.

The content item reference file and/or information may identify one or more content item identifiers indicative of one or more content items and one or more content application identifiers indicative of one or more content applications (e.g., hosted applications) associated with the one or more content items. For example, the content item reference file and/or information may include, but are not limited to, a playlist, a manifest file, an MPD file, and an index file. The one or more content item identifiers may indicate one or more content items associated with a channel (e.g., a linear channel). The one or more content application identifiers may indicate one or more content applications associated with the one or more content items. Specifically, the one or more content applications may be one or more hosted applications installed in the user device 121-123. The one or more content application identifiers may be one or more Uniform Resource Identifiers (URIs), one or more supplemental properties, one or more SCTE 35 messages, and/or one or more events that can occur periodically. The one or more content application identifiers may indicate that the one or more content applications (e.g., hosted applications) identified by the one or more content application identifiers can play the one or more content items.

A common format and/or template (e.g., segment templates, etc.) may be used to generate different types of content reference files associated with a content item, such as a manifest, an HTTP Live Streaming (HLS) playlist, or Dynamic Adaptive Streaming over HTTP (DASH) MPD file associated with the content item. For example, a manifest, an HLS playlist, and/or a DASH MPD file may each be configured/formatted to be parsed and interpreted by a user device based on the common format and/or template.

The system 100 may include an aggregator device 128 (e.g., an edge device, a server, a computing device, etc.). The aggregator device 128 may enable/send content, services, and/or the like to a destination device (e.g., the user device 121-123). The aggregator device 128 may be one of a plurality of aggregator devices distributed across the network 116. The aggregator device 128 may be located in a region proximate to the user device 121, 122, 123. A request for content from the user device 121, 122, 123 may be directed to the aggregator device 128 (e.g., due to the location of the aggregator device and/or network conditions). The aggregator device 128 may receive packaged content and/or content items (e.g., from the computing device 126, the central location 101, and/or any of the sources 102*a-c*) for delivery to the user device 121-123, convert content and/or content items for delivery to the user device 121-123 (e.g., in a specific format requested by a user device), send the user device 121-123 a content item reference file (e.g., a playlist, a manifest file, an MPD file, an index file, etc.) describing portions of the content and/or content items, send streaming (e.g., unicast, multicast) content, enable/cause a file transfer, and/or the like. The aggregator device 128 may cache or otherwise store content and/or content items (e.g., frequently requested content and/or content items) to enable faster delivery of content and/or content items to the user device (e.g., the user device 121-123, etc.).

The aggregator device 128 may send the user device 121-123 a content item reference file (e.g., a playlist, a manifest file, an MPD file, an index file, etc.) describing one or more content items that are associated with one or more content applications (e.g., hosted applications). For example, the content item reference file (e.g., a playlist, a manifest file, an MPD file, an index file, etc.) may include one or more content item identifiers indicative of one or more content items and one or more content application identifiers indicative of one or more content applications (e.g., hosted applications) associated with the one or more content items. Specifically, the one or more content applications may be one or more hosted applications installed in the user device 121-123. The one or more content application identifiers may be one or more Uniform Resource Identifiers (URIs), one or more supplemental properties, one or more SCTE 35 messages, and/or one or more events that can occur on a period basis. The one or more content application identifiers (e.g., URIs, supplemental properties, etc.) may indicate that the one or more content applications (e.g., hosted applications) associated with the one or more content application identifiers include the one or more content items to play.

The aggregator device 128 may receive a request for a content item from the user device 121-123 and send/transmit the requested content items to the user device 121-123. The aggregator device 128 may monitor output/playback (e.g., output, display, consumption, etc.) of content items sent/transmitted to the user device 121-123. The user device 121-123 may be configured to generate and send/transmit data regarding the state and/or operation of the user device 121-123, for example, during output/playback of a content item. The aggregator device 128 may receive and aggregate data related to output/playback of a content item at a user device (e.g., the user device 121-123, etc.). The user device (e.g., the user device 121-123, etc.) may be configured to periodically send a request, for example to the aggregator device 128, to determine the existence of the content item reference files (e.g., playlist, manifest files, MPD files, index files, etc.) and/or receive updates to the content item reference files. For example, the user device 121-123 may periodically send a request for new and/or updated content item reference files (e.g., playlist, manifest files, MPD files, index files, etc.) associated with a content item or the channel (e.g., a linear channel).

As described above, a user device 121-123 may receive one or more content item reference files (e.g., playlist, manifest files, MPD files, index files, etc.) from the computing device 126 and/or the aggregator device 128. The content item reference file may comprise one or more content item identifiers and one or more content application identifiers. The one or more content item identifiers may indicate one or more content items (e.g., VOD assets) associated with a channel (e.g., a linear channel). The one or more content application identifiers may indicate one or more content applications that can output the one or more content items. The one or more content applications may comprise one or more hosted applications accessible to the user device 121-123. For example, the one or more content applications may be installed in the user device 121-123. The one or more content application identifiers may be one or more Uniform Resource Identifiers (URIs), one or more supplemental properties, one or more SCTE 35 messages, and/or one or more events that can occur on a period level (e.g., the period level that indicates the content items in the linear channel).

The user device 121-123 may determine the one or more content applications (e.g., hosted applications) to provide the one or more content items based on the one or more content item identifiers and the one or more content application identifiers. For example, the user device 121-123 may display an instruction or an option to select a content item from among the one or more content items. The content item selected may be associated with a content item identifier of the one or more content item identifiers. The user device 121-123 may determine, based on the content item reference file, the content application identifier (of the one or more content applications) associated with the content item identifier. The content item selected may be provided by the content application of the one or more content applications. The instruction or option to select the content item from the one or more content items may be displayed through a graphic overlay. Based on the selection, the user device 121-123 may cause display of the content item via the content application (e.g., a hosted application).

In an example, the user device 121-123 may display an instruction or an option to select at least a portion of a content item of the one or more content items. The portion of the content item or the content item may be associated with a content application (e.g., a hosted application) of the one or more content applications. Based on the selection of the portion of the content item, the user device 121-123 may cause an output of the content item via the content application (e.g., the hosted application). The portion of the content item to be provided by the content application (e.g., a hosted application) may be the same or subsequent portion of the content item being output by the channel (e.g., a linear channel) or by the main player application of the user device 121-123.

Figure 2:
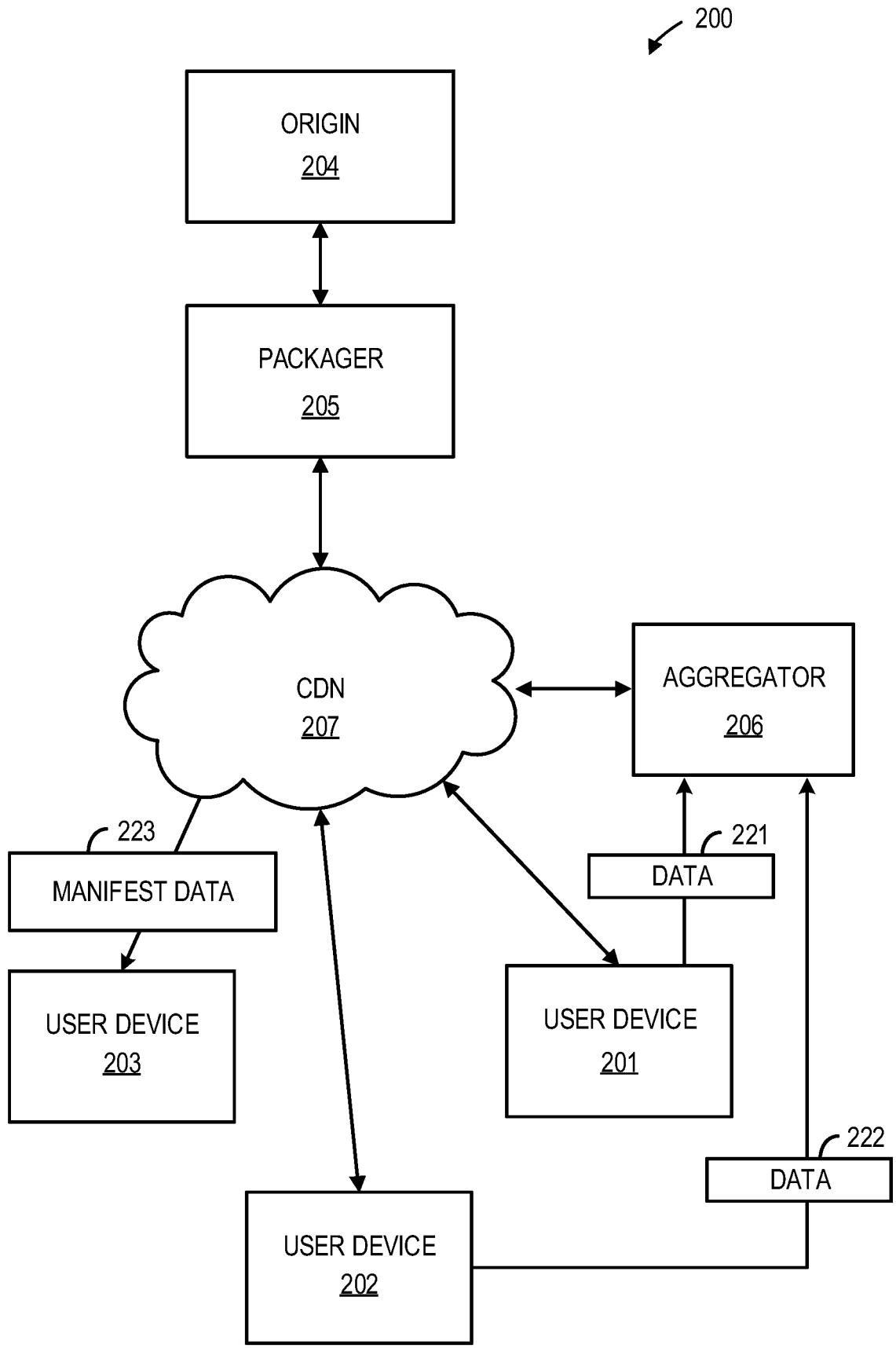
FIG. 2 shows another example system.

FIG. 2 shows an example system 200 for selecting content applications for outputting a selected content item. An origin 204 (e.g., a content source, the content source 127, an origin, etc.) may output (e.g., be a source for) one or more content items (e.g., videos, video/audio assets, movies, programs, shows, etc.) distributed through a network to one or more user devices (e.g., content/media players, client devices, mobile devices, smart devices, user device 201-203, etc.). The origin 204 may divide a content item into "chunks," such as a respective plurality of portions/segments. Each of the portions/segments may correspond to a particular duration (e.g., one second of content, two seconds of content, five seconds of content, etc.) of the content item. Each of the portions/segments may be identified using a file name. The file name may include an identifier of the particular representation of a content item to which it corresponds. Content items from the origin 204 may be transmitted/sent to a packager 205.

Content items may be transcoded and fragmented before being sent/transmitted to the packager 205. Content items may be converted, for example, from one format (e.g., video format, audio format, etc.) to another format (e.g., video format, audio format, etc.), such as a format amenable to how the one or more user devices 201-203 consume, view, and/or output/playback (e.g., output, cause output, display, cause display, etc.) the content items.

The packager 205 may receive content items from the origin 204 that have been transcoded, fragmented, and/or the like. The packager 205 may combine the content items that have been transcoded, fragmented, and/or the like into a packaged content item. Packaged content items may be sent to the user device 201-203 to facilitate output/playback. To facilitate output/playback of a content item, the packager 205 may generate a manifest file (e.g., a content item reference file, an MPD file, an index file, a resource locator file, etc.) associated with the content item.

A manifest file may comprise information describing various aspects of the associated content item that may be useful for the user device 201-203 to output/playback the content item and/or for other devices/components of the system 200 (e.g., the origin 204, an aggregator 206, etc.) to store and/or retrieve the content item. For example, a manifest file may indicate each of a plurality of segments/fragments of a content item, the output/playback duration of each segment/fragment, the number of segments/fragments, and/or the proper ordering of the segments/fragments necessary to effectuate an output/playback of the content item. A manifest file may comprise a network location (e.g., a hyper-text transfer protocol (HTTP) uniform resource locater (URL) link or other universal resource identifiers (URIs)) for each segment/fragment from which the segment/fragment may be downloaded, accessed, and/or retrieved. It will be appreciated that the network locations included within a manifest file may point to more than one different location or source.

The manifest file may comprise one or more content item identifiers indicative of one or more content items and one or more content application identifiers indicative of one or more content applications (e.g., hosted applications) associated with the one or more content items. For example, the manifest file may be a playlist, an MPD file, an index file, or the like. The one or more content item identifiers may indicate one or more content items associated with a channel (e.g., a linear channel). The one or more content application identifiers may indicate one or more content applications associated with the one or more content items. For example, the one or more content applications may be one or more hosted applications accessible to the user device 201-203. The one or more content application identifiers may be one or more URIs, one or more supplemental properties, one or more SCTE 35 messages, and/or one or more events that can occur periodically. The one or more content application identifiers may indicate that the one or more content applications (e.g., hosted applications) identified by the one or more content application identifiers may provide or output the one or more content items.

The manifest file may be sent/transmitted to any of the user device 201-203. For example, the manifest file may be sent/transmitted to the user device 201-203 in response to a request for a content item. The user device 201-203 may use the manifest file to determine segments/fragments required to output/playback a content item or a portion of the content item and subsequently download the required segments/fragments using the network locations specified in the manifest file.

The user device 201-203 may determine a content application (e.g., a hosted application) to provide a content item based on the manifest file. For example, the user device 201-203 may cause display of one or more options to select the content item associated with the content application. The one or more options to select the content item may be displayed through a graphic overlay or a user interface. Based on the selection, the user device 201-203 may cause output of the content item via the content application (e.g., a hosted application). The user device 201-203 may also cause display of a playlist of content items to select the content item as one of the options.

In an example, the user device 201-203 may output a first content item. The first content item may be a content item that is currently being output in the channel (e.g., a linear channel). The first content item may be output via the player application of the user device 201-203 (e.g., the main player application installed in the user device 201-203). The user device 201-203 may determine which content application is associated with the first content item among the one or more content applications. The content application associated with the first content item may be determined based on the manifest file. For example, the user device 201-203 may determine the content application based on the first content item identifier indicating the first content item and the first content application identifier indicating the content application that is associated with the first content item. The first content item identifier may be one of the one or more content item identifiers in the manifest file. The first content application identifier may be one of the content application identifiers in the manifest file.

After the user device 201-203 completes the first content item (e.g., reaches an endpoint of the first content item), the user device 201-203 may cause display of an instruction to select a second content item. The second content item may be associated with the first content item. For example, the second content item may be the next sequential episode or television show of the first content item. Based on selecting the second content item, the user device 201-203 may cause the content application to provide or output the second content item.

The aggregator 206, for example, may receive and fulfill a request from any of the user devices 201-203, via the content delivery network (CDN) 207, to deliver a content item to the user device 201-203 for output/playback. A request for a content item may include an identification of the user device 201-203 (e.g., an account identifier, a username/password, etc.) and/or the requested content item. Based on the request for the content item, the aggregator 206 may send/transmit one or more manifest files from the packager 205 to the user device 201-203 via the CDN 207 that describe the content item and/or segments/fragments thereof, including network locations from which each segment/fragment may be downloaded. For example, the aggregator 206 may send the manifest data 223 to the user device 203 via the CDN 207. The manifest file (e.g., manifest data 223) may enable the user device 201-203 to iteratively download and begin output/playback of a content item.

The output/playback of the content item sent/transmitted to the user device 201-203 may be monitored. The aggregator 206 may monitor the output/playback of the content item sent/transmitted to the user device 201-203. The user device 201-203 may be configured to generate and send/transmit operation data 221 and 222 regarding the state and/or operation of the user device 201-203, for example, during output/playback of a content item. Operation data 221 and 222 may include, for example, data/information from various data sources configured with and/or associated with a user device. For example, various data sources configured with and/or associated with a user device may include an application and/or API, a processor, a buffer, a sensor (e.g., haptic sensor, infrared sensor, an audio/voice detection device and/or microphone, gyroscope, accelerometer, etc.), and/or any other component (e.g., hardware component, software component, etc.) of the user device. The data/information from various data sources may be collected and combined with timing data according to one or more automated communication processes before, during, and/or after output/playback of the content item. Operation data may include and/or be formatted as chunks/fragments of information typically used in multimedia formats, metadata, and/or the like.

Figure 3:
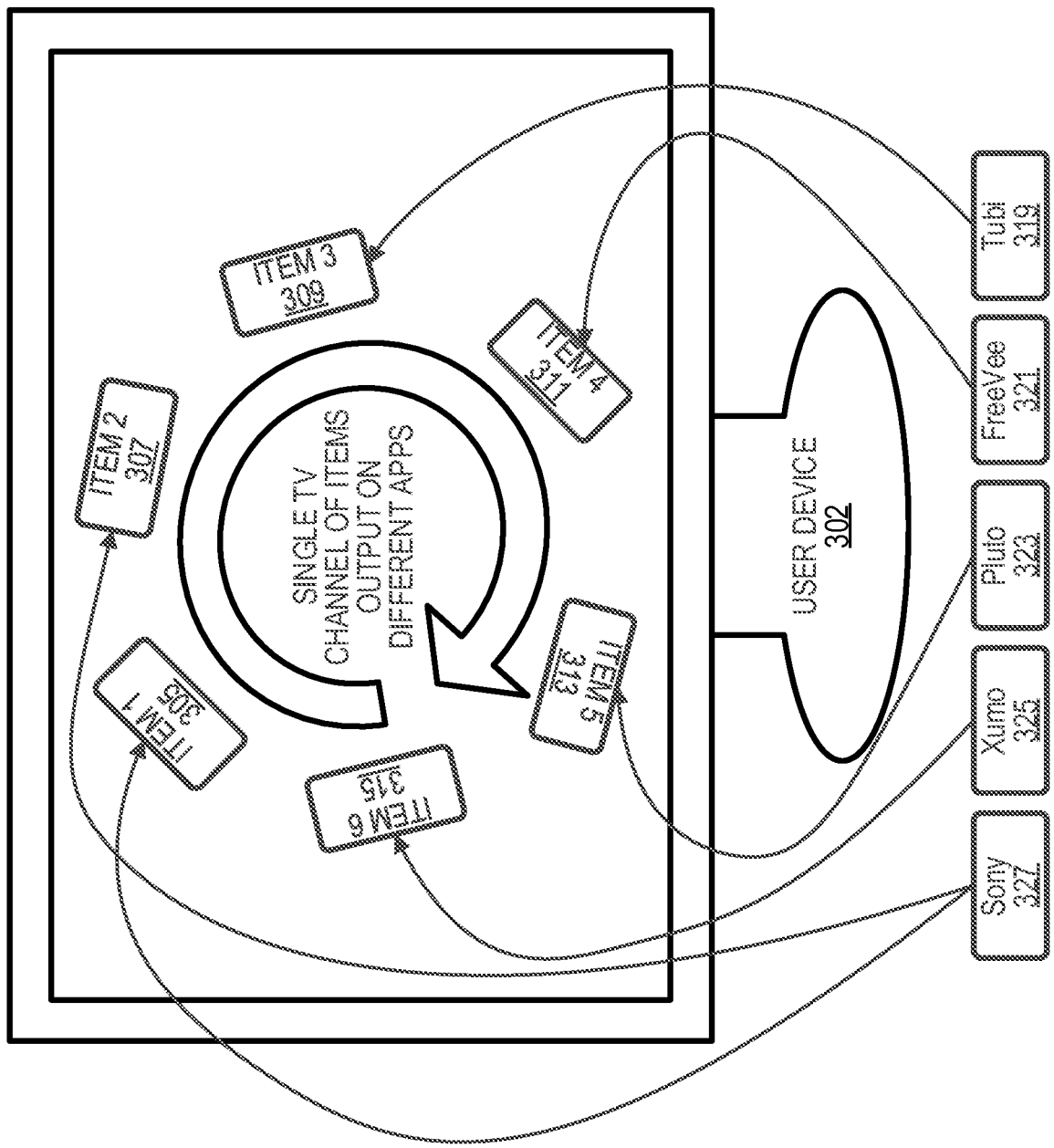
FIG. 3 shows an example diagram.

FIG. 3 shows an example diagram 300 for selecting content applications for outputting a selected content item. As shown in FIG. 3, a user device 302 may display content items 1-6 305, 307, 309, 311, 313, 315 associated with a channel (e.g., a linear channel, a single TV channel, etc.). A user of the user device 302 may select a content item from the content items 1-6 305, 307, 309, 311, 313, 315. The selected content item may be played, provided, or output by a continent application of content applications 319, 321, 323, 325, 327. The content items 1-6 305, 307, 309, 311, 313, 315 may be displayed in various forms for different purposes. For example, as shown in FIG. 3, the content items 1-6 305, 307, 309, 311, 313, 315 may be arranged in a circular or rotational form on the display device of the user device 302. Examples of the forms may include, but are not limited to, a personal playlist, a genre-based playlist, a channel-specific playlist, an on-demand playlist, a streaming service playlist, a kid's programming playlist, a talk show playlist, a time period playlist, a seasonal playlist, a top chart playlist, and a local programming playlist. The user device 302 may be one of the user devices 121-123 in FIG. 1 or the user devices 201-203 in FIG. 2. For example, the user device 302 may be a content/media player, a client device, a mobile device, a laptop computer, a desktop computer, a computing device, a smart device, a set-top box, a smart TV, or the like.

As shown in FIG. 3, the content items 305, 307, 309, 311, 313, 315 may be associated with one or more of the content applications (or hosted applications) 319, 321, 323, 325, 327. The content applications (or hosted applications) 319, 321, 323, 325, 327 may play, provide, or output the content items 305, 307, 309, 311, 313, 315. The content applications (or hosted applications) 319, 321, 323, 325, 327 may be streaming platforms that may provide FAST channels, non-FAST channels, and/or streaming services. Examples of content applications (or hosted applications) are Pluto TV, Tubi, Roku Channel, IMDb TV, Xumo, Netflix, Amazon Prime Video, Disney+, Apple TV+, Peacock, and Hulu.

One or more content items 305, 307, 309, 311, 313, 315 may be associated with one or more content applications 319, 321, 323, 325, 327. For example, the two content items 1-2 305, 307 associated with the channel (e.g., the linear channel) may also be played, provided, or output by a Sony application 327. The content item 3 309 associated with the channel may also be played, provided, or output by a Tubi application 319. The content item 4 311 associated with the channel may also be played, provided, or output by a FreeVee application 321. The content item 5 313 associated with the channel may also be played, provided, or output by a Pluto application 323. The content item 6 315 associated with the channel may also be played, provided, or output by a Xumo application 325. The association information between the content items 1-6 305, 307, 309, 311, 313, 315 and the content applications 319, 321, 323, 325, 327 may be provided by a content reference file such as a manifest file as described above.

Figure 4:
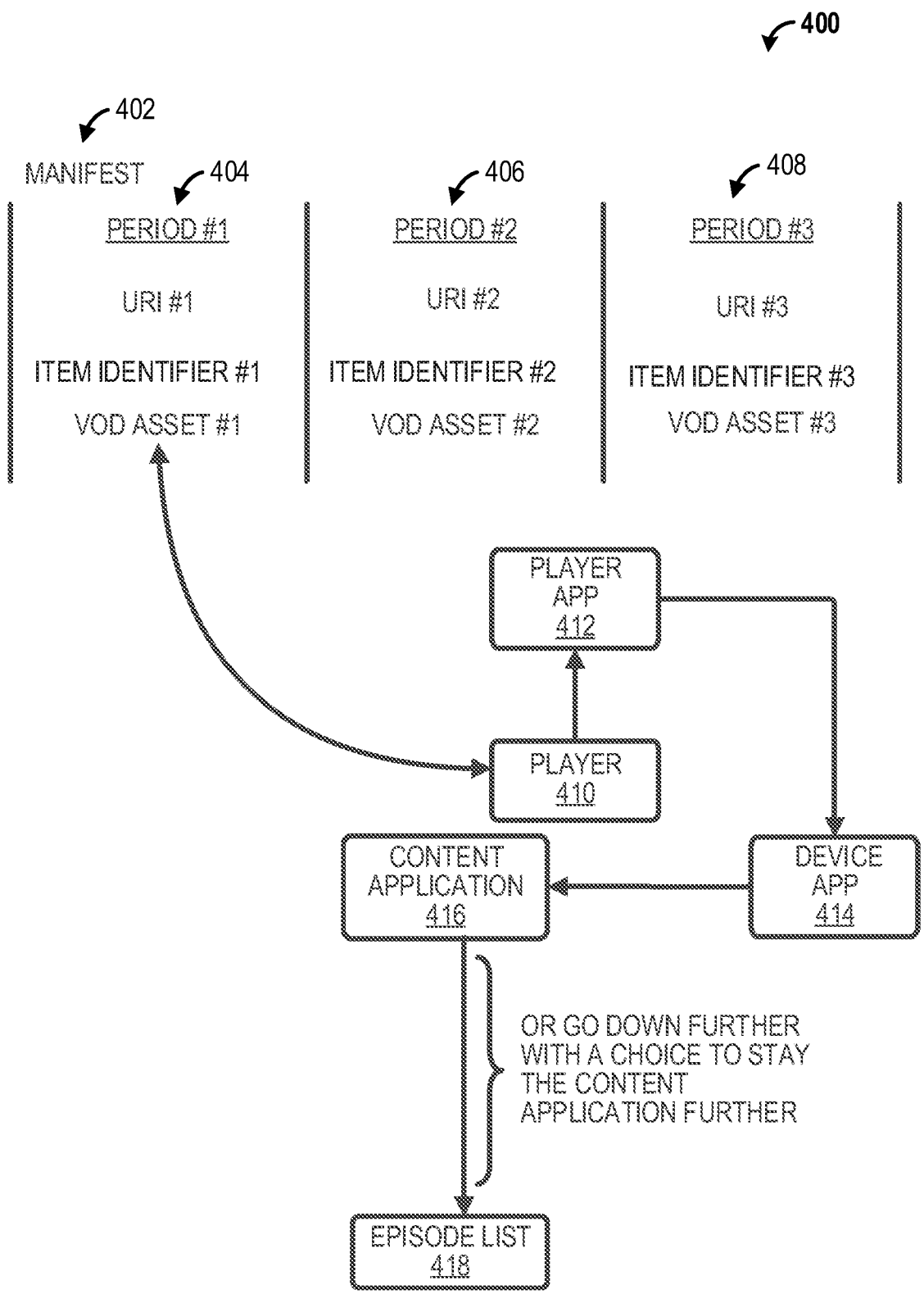
FIG. 4 shows an example communications flow.

FIG. 4 shows an example communication flow 400 for selecting content applications for outputting or providing selected content items. As shown in FIG. 4, a player 410 may receive a manifest file 402. The manifest file 402 may comprise a content item reference file, as described above. The player 410 may be a main player, a standard player or a general player of user device 121-123 (e.g., a set-top box). The player 410 may include a player application 412 to display or output audio and video content. The player 410 and/or the player application 412 may be responsible for decoding and rendering the audio and video content on the user device 121-123 (e.g., a smart TV, smartphone, tablet computer, laptop computer, desktop computer, or the like). The player 410 may be used with any content application such as a content application 416. The content application 416 may play, provide, or output one or more content items for a FAST channel and/or a non-FAST channel. The manifest file 402 may be associated with a channel (e.g., a linear channel). The manifest file 402 may provide information about the structure, timing, content of a linear programming schedule of content items, and content applications (e.g., hosted applications) that can play the content items of the linear programming schedule.

As shown in FIG. 4, the manifest file 402 may comprise Uniform Resource Identifiers (URIs) 1-3 (e.g., URLs at supplemental properties) indicating the content applications (e.g., hosted applications) and content item identifiers indicating content items or VOD assets. For example, the manifest file 402 may indicate that VOD asset #1 is played in the channel during period #1 404 and the content item identifier #1 indicating the VOD asset #1 is associated with a content application (e.g., a hosted application) identified by the URI #1 (e.g., URL, Uniform Resource Name (URN)).

During the periods 404, 406, 408 or at the end of the periods 404, 406, 408 (e.g., the endpoints of the respective content items), the player 410 and/or the player application 412 may display, via a user interface (e.g., on the user device 121-123, 201-203) an instruction or an option to a user of the user device 121-123, 201-203 whether the user wants to watch the content item that the user has watched or additional content item related to the content item (e.g., next episode), via the content applications (e.g., hosted applications) identified by content application identifiers, such as URIs #1-3. For example, during period #1 404 or at the end of period #1 404 (e.g., about to reach an endpoint of period #1 404), the player 410 and/or the player application 412 may display a graphic overlay on a display or a user interface associated with the user device 121-123, 201-203, that asks the user if the user wants to watch the VOD asset #1 that the user was watching via the channel or one or more additional VOD assets related to the VOD asset #1, via the content application 416. Based on the user's input or selection (e.g., selection information) received by the player 410, the player 410 and/or the player application 412 may send the selection information to the device application 414 that manages the player 410, the player application 412, and the content application 416. For example, the selection information may comprise information about the content item (e.g., VOD asset #1) that the user was watching and the URI (e.g., URI #1) indicating a content application 416 that can play the content item (e.g., VOD asset #1). The device application 414 may cause the content application 416 to display an episode list 418 that includes the content item (e.g., VOD asset #1) and/or other content items related to the content item (e.g., other (e.g., subsequent or prior) episodes of the same television series as VOD asset #1). Alternatively or additionally, after the content item (e.g., VOD asset #1) and/or other content items related to the content item (e.g., VOD asset #1) have reached an end point or ended, the content application 416 may display a choice, via the display or the user interface associated with the user device 121-123, 201-203, as to whether the user wants to continue receiving content items (e.g., other (e.g., subsequent or prior) episodes of the same television series as VOD asset #1) from the particular content application 416.

In one example, when a content item being played, provided or output by the player 410 or the player application 412 is nearly finished (e.g., about to reach an endpoint for the content item), a graphic overlay may be output on the screen or user interface of the user device 121-123, 201-203. The graphic overlay may comprise one or more buttons, lists, or tables with one or more prompts to determine which content item the user of the user device 121-123, 201-203 wants to watch. For example, the one or more prompts may ask the user if the user wants to continue receiving and watching the current content item being played by the player 410 or the player application 412. Alternatively or additionally, the one or more prompts may ask the user if the user wants to watch the current content item being played by the player 410 or the player application 412 via the content application 416 that can play the current content item. Alternatively or additionally, the one or more prompts may ask the user if the user wants to watch the next content item (e.g., the next sequential episode or any other episode of the television series associated with the current content item) via the content application 416 that can play the next content item. Alternatively or additionally, the one or more prompts may ask the user if the user wants to watch other content items related to the current content item being played by the player 410 or the player application 412 via other content applications that can play other content items.

Figure 5:
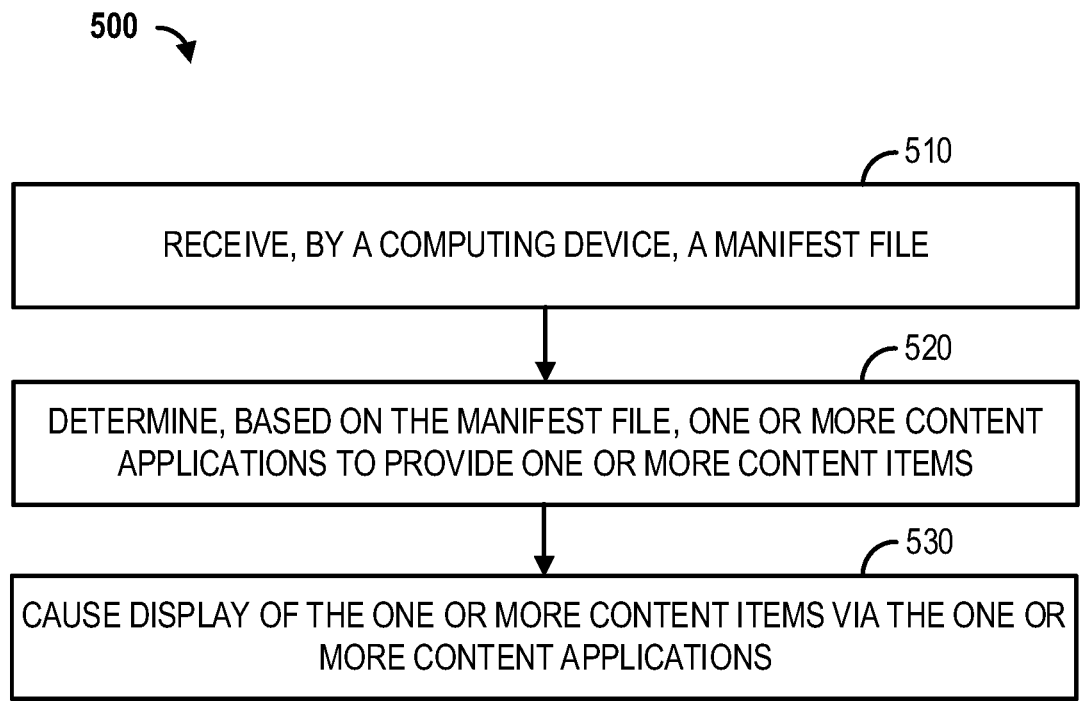
FIG. 5 shows a flowchart of an example method.

FIG. 5 shows an example method 500 for selecting content applications for outputting or providing selected content items. The method 500 may be performed by any device such as the user device 121-123, 201-203 and/or the computing device 126. At 510, a manifest file may be received. For example, the user device 121-123, 201-203 may receive the manifest file associated with a channel (e.g., a linear channel). The manifest file may be a playlist, an MPD file, an index file, or the like. The manifest file may comprise one or more content item identifiers and one or more content application identifiers. The one or more content item identifiers may indicate one or more content items associated with (e.g., being output by or to be output by) the channel. The one or more content item identifiers may be one or more VOD content item identifiers. The one or more content application identifiers may indicate one or more content applications associated with one or more of the one or more content items. For example, the one or more content application identifiers may indicate one or more content applications (e.g., hosted applications) that can play, provide, or output one or more of the one or more content items.

The one or more content applications may be one or more hosted applications installed in or accessible by the user device 121-123, 201-203. The one or more content application identifiers may be one or more URIs, one or more URLs, one or more URNs, one or more supplemental properties, one or more SCTE 35 messages, and/or one or more events that can occur periodically. One or more of the one or more content application identifiers being associated with one or more of the one or more content items may indicate that one or more of the one or more content applications (e.g., hosted applications) identified by the one or more of the one or more content application identifiers is able to play, provide, or output the one or more of the one or more content items. For example, a first content application identifier associated with a first content application and being associated with a first content item identifier associated with a first content item may indicate the first content application is able to play, provide, or output the first content item to the user device 121-123, 201-203

At 520, the one or more content applications may be determined. For example, the user device 121-123, 201-203 may determine the one or more content applications to play, provide, or output the one or more content items. The user device 121-123, 201-203 may determine the one or more content applications based on the one or more content item identifiers and/or based on the one or more content application identifiers. For example, each content item identifier may be associated with one or more respective content application identifiers in the manifest file. For example, the user device 121-123, 201-203 may display an instruction, prompt, or an option to select a content item of the one or more content items. For example, the user device 121-123, 201-203 may display a table or listing of available content items that may be selected. The user device 121-123, 201-203 may receive a selection from the user of the user device 121-123, 201-203. The selection may indicate the content item that the user of the user device 121-123, 201-203 selected. The user device 121-123, 201-203 may send the selection of the content item or a message or signal indicating the selected content item to the particular content application to play, provide, or output the selected content item to the user device 121-123, 201-203. The selected content item may be identified by a content item identifier of the one or more content item identifiers. The content item identifier may be associated with a content application identifier of the one or more content application identifiers in the manifest file. The content application identifier may be associated with a content application of the one or more content applications that may play, provide, or output the selected content item to the user device 121-123, 201-203. Thus, the user device 121-123, 201-203 may determine, based on the content item identifier and/or the content application identifier associated with the content item identifier, the content application that can play, provide, or output the selected content item to the user device 121-123, 201-203.

In another example, the user device 121-123, 201-203 may display an instruction, a prompt, or an option to select a portion of a content item of the one or more content items. The portion of the content item may be any portion of spot along the timeline of the content item, such as at the beginning, in the middle, or at the end of the content item. For example, the user device 121-123, 201-203 may display a table or listing of available portions of the content item or other content items that may be selected. The user device 121-123, 201-203 may receive the selection of the portion of the content item from the user of the user device 121-123, 201-203. The selection may indicate the portion of the content item. The user devices 121-123, 201-203 may send the selection of the portion of the content item or a message or signal indicating the selected portion of the content item to a particular content application of the one or more content applications to play, provide, or output the selected portion of the content item to the user device 121-123, 201-203. For example, the content application may play, provide, or output the content item beginning from the same or subsequent portion to the content item last played by the main player application. For example, if the user was twenty minutes into watching a content item, and based on the selection to start watching the content item at the twenty minute mark from the beginning of the content item, the content application may play, provide, or output the content item beginning at the twenty minute mark from the beginning of the content item.

In another example, the user device 121-123, 201-203 may display a playlist of the one or more content items for the selection of a content item. The one or more content items may be displayed in various forms of playlists associated with the channel (e.g., a linear channel). For example, as shown in FIG. 3, the one or more content items may be arranged in a circular or rotational form on the display device of the user device 121-123, 201-203. For example, the playlist may be a personal playlist, a genre-based playlist, a channel-specific playlist, an on-demand playlist, a streaming service playlist, a kid's programming playlist, a talk show playlist, a time period playlist, a seasonal playlist, a top chart playlist, or a local programming playlist. In another example, the playlist may be a playlist based on a clock schedule. Such a playlist may be a regular linear channel that can play one or more content items at a particular time. The user device 121-123, 201-203 may receive the selection of the content item or the portion of the content item, via a user interface or display, from the user of the user device 121-123, 201-203. The selection may indicate the content item. The user device 121-123, 201-203 may send the selection of the content item or a message or signal indicating the selected content item to the content application to play, provide, or output the selected content item to the user device 121-123, 201-203.

In another example, the user device 121-123, 201-203 may determine a first content item of the one or more content items. The first content item may be the content item (e.g., a VOD content item) that is currently being played, provided, or output by the channel (e.g., the linear channel). The first content item may be identified by a first content item identifier of the one or more content item identifiers. The first content item identifier may be associated with a first content application identifier of the one or more content application identifiers in the manifest file. The first content application identifier may be associated with a content application of the one or more content applications that may play, provide, or output the selected content item to the user device 121-123, 201-203. Thus, the user device 121-123, 201-203 may determine the content application based on the first content item identifier and/or the first content application identifier associated with the first content item identifier. Based on the first content item having reached an endpoint (e.g., the episode ending) on the channel, the user device 121-123, 201-203 may display an instruction, a prompt, or an option to select a second content item. The instruction to select the second content item may be displayed via a graphic overlay on a display associated with the user device 121-123, 201-203. The second content item may be a content item subsequent to the first content item (e.g., the next sequential episode, or any other episode, in a television series associated with the first content item). The second content item may be played, provided, or available to be output by the content application.

The user device 121-123, 201-203 may receive, via the user interface or display, a selection from the user of the user device 121-123, 201-203. The selection may indicate the second content item that the user of the user device 121-123, 201-203 selected. The user device 121-123, 201-203 may send the selection of the second content item or a message or signal indicating the selected second content item to the content application to play, provide, or output the second content item. At 530, the one or more content may be played, provided, or output. For example, the user device 121-123, 201-203 may cause a content application of the one or more content applications to play, provide, or output the one or more content items (e.g., the content item, the portion of the content item, the first content item, or the second content item).

Figure 6:
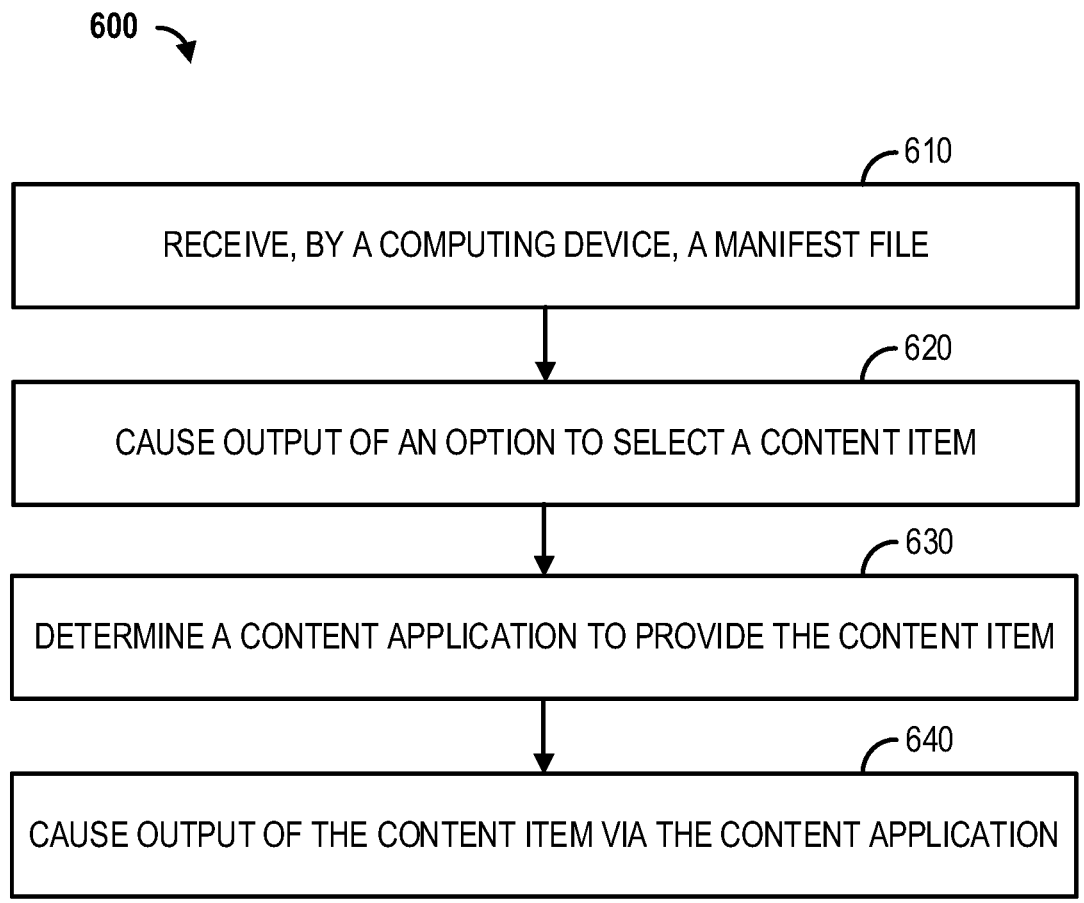
FIG. 6 shows a flowchart of an example method.

FIG. 6 shows an example method 600 for selecting content applications for outputting or providing selected content items. The method 600 may be performed by any device such as the user device 121-123, 201-203 and/or the computing device 126. At 610, a manifest file may be received. For example, the user devices 121-123, 201-203 may receive the manifest file associated with a channel (e.g., a linear channel). The manifest file may comprise one or more content item identifiers and one or more content application identifiers. The one or more content item identifiers may indicate one or more content items associated with the channel. The one or more content application identifiers may indicate one or more content applications associated with or that may play, provide or output the one or more content items. Thus, the one or more content item identifiers and the one or more content application identifiers are associated with each other based on the one or more content items.

The one or more content item identifier and the one or more content application identifier may be included in the manifest file based on one or more periods. For example, a first content item identifier and a first content application identifier may be associated with a first period. Similarly, a second content item identifier and a second content application identifier may be associated with a second period. The first content application identifier may be associated with the first content application identifier indicating the first content application that can play, provide, or output the first content item. The second content application identifier may be associated with the second content application identifier indicating the second content application that can play, provide, or output the second content item. The one or more content applications may be one or more hosted applications installed in or accessible by the user device 121-123, 201-203. As described above, examples of the one or more content application identifiers may include, but are not limited to, a URI, a URL, a URN, a supplemental property, a SCTE 35 message, and an indication of an event that can occur periodically.

At 620, an instruction, prompt, or an option to select a content item may be displayed. For example, the user device 121-123, 201-203 may display the instruction, the prompt or the option to select a content item of the one or more content items to the user of the user device 121-123, 201-203. For example, the user device 121-123, 201-203 may display a table or listing of available content items that may be selected. The selected content item may be associated with a content item identifier of the one or more content item identifiers. The instruction, the prompt, or the option to select the content item may be displayed through a graphic overlay on a display associated with the user device 121-123, 201-203. The graphic overlay may display a playlist of the available content items that may be selected. The user device 121-123, 201-203 may receive, via the user interface or display, a selection from the user of the user device 121-123, 201-203. The selection may indicate the content item that the user of the user device 121-123, 201-203 selected. The user device 121-123, 201-203 may send the selection of the content item or a message or signal indicating the selected content item to the content application that can play, provide, or output the content item.

At 630, a content application to play, provide, or output the selected content item may be determined. For example, the content item identifier for the selected content item may be associated with a content application identifier of the one or more content application identifiers in the manifest file. The content application identifier may be associated with a content application of the one or more content applications that may play, provide, or output the selected content item to the user device 121-123, 201-203. Thus, the user device 121-123, 201-203 may determine, based on the content item identifier and/or the content application identifier associated with the content item identifier, the content application that can play, provide, or output the selected content item to the user device 121-123, 201-203. The content application may be a hosted application installed in or accessible by the user device 121-123, 201-203. At 640, the selected content item may be played, provided, or output. For example, the user devices 121-123, 201-203 may cause the content application to play, provide, or output the selected content item.

Figure 7:
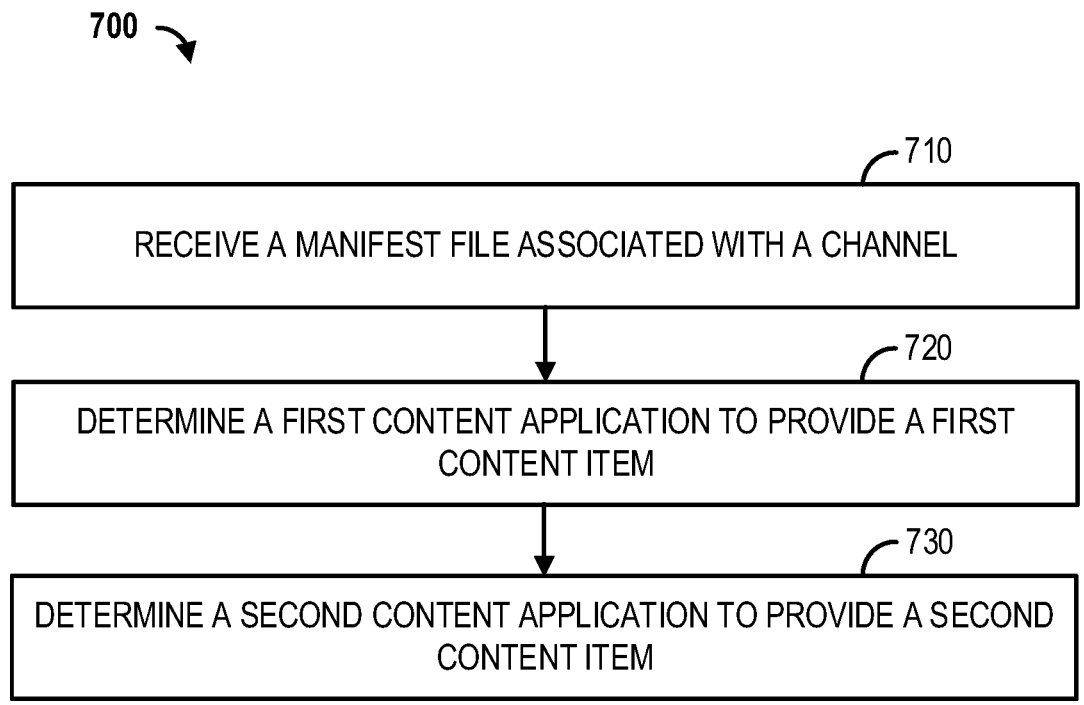
FIG. 7 shows a flowchart of an example method.

FIG. 7 shows an example method 700 for selecting content applications for outputting or providing selected content items. The method 700 may be performed by any device, such as the user device 121-123, 201-203 and/or the computing device 126. At 710, a manifest file may be received. For example, the user device 121-123, 201-203 may receive the manifest file associated with a channel (e.g., a linear channel). The manifest file may comprise a plurality of content item identifiers indicative of a plurality of content items and a plurality of content application identifiers indicative of a plurality of content applications. The first content item identifier of the plurality of content item identifiers may indicate a first content item. The first content application identifier of the plurality of content application identifiers may indicate a first content application that may play, provide, or output the first content. Thus, the first content item identifier and the first content application identifier in the manifest file are associated with each other based on the first content item. The second content item identifier of the plurality of content item identifiers may indicate a second content item. The second content application identifier of the plurality of content application identifiers may indicate a second content application that may play, provide, or output the second content. Thus, the second content item identifier and the second content application identifier in the manifest file are associated with each other based on the second content item.

At 720, the first content application may be determined. For example, the user device 121-123, 201-203 may determine the first content application based on the manifest file. For example, the user devices 121-123, 201-203 may determine the first content application based on the first content item identifier of the plurality of content item identifiers and the first content application identifier of the plurality of content application identifiers. As described above, the first content item identifier may be associated with the first content application identifier in the manifest file. The first content application identifier may be associated with the first content application that may play, provide, or output the first content item to the user device 121-123, 201-203. Thus, the user device 121-123, 201-203 may determine, based on the first content item identifier and/or the first content application identifier associated with the first content item identifier, the first content application that can play, provide, or output the first content item.

At 730, the second content application may be determined. For example, the user devices 121-123, 201-203 may determine the second content application based on reaching an endpoint of the first content item and the manifest file. For example, based on the first content item having reached an endpoint (e.g., the episode ending), the user devices 121-123, 201-203 may determine the second content application based on the manifest file. For example, the user devices 121-123, 201-203 may determine the second content application based on the second content item identifier of the plurality of content item identifiers and the second content application identifier of the plurality of content application identifiers. As described above, the second content item identifier may be associated with the second content application identifier in the manifest file. The second content application identifier may be associated with the second content application that may play, provide, or output the second content item to the user device 121-123, 201-203. Thus, the user device 121-123, 201-203 may determine, based on the second content item identifier and/or the second content application identifier associated with the second content item identifier, the second content application that can play, provide, or output the second content item.

Based on reaching an endpoint of the first content item, the second content item may be selected. For example, the user devices 121-123, 201-203 may display an instruction, prompt, or an option to select the second content item of one or more content items. For example, based on reaching an endpoint of the first content item (e.g., a TV episode ending), the user devices 121-123, 201-203 may display the instruction, the prompt, or the option to select the second content item to the user of the user devices 121-123, 201-203. For example, the user device 121-123, 201-203 may display a table or listing of available content items that may be selected. The instruction, the prompt, or the option to select the second content item may be displayed through a graphic overlay on a display associated with the user device 121-123, 201-203. The graphic overlay may display a playlist of the available content items that may be selected. The user device 121-123, 201-203 may receive, via the user interface or display, the selection from the user of the user devices 121-123, 201-203. The selection may indicate the second content item that the user of the user device 121-123, 201-203 selected. The user device 121-123, 201-203 may send the selection of the second content item or a message or signal indicating the second content item to the second content application that can play, provide, or output the second content item.

In an example, the first content application may be a hosted application installed in or accessible by the user device 121-123, 201-203. The first content application may be a Free Ad-Supported Television (FAST) channel application or a non-FAST channel application. In another example, the second content application may be a hosted application installed in or accessible by the user device 121-123, 201-203. The second content application may be a FAST channel application or a non-FAST channel application. The first content item may be provided by a first content provider and the second content item may be provided by a second content provider. The first content provider and the second content provider may be different.

For example, the first content application may be a hosted application (e.g., Tubi) that can support a FAST channel. The second content application may be a hosted application (e.g., XUMO) that can support the FAST channel. A first content provider (e.g., a FOX Broadcasting Company) may provide the first content item (e.g., FOX News). A second content provider (e.g., National Broadcasting Company (NBC)) may provide the second content item (e.g., Friends). The user devices 121-123, 201-203 may cause the first content application (e.g., Tubi) to play, provide, or output the first content item (e.g., FOX News). Based on reaching an endpoint of the first content item (e.g., FOX news), the user devices 121-123, 201-203 may cause the second content application (e.g., XUMO) to play, provide, or output the second content item (e.g., Friends), as described above.

In another example, the first content application may be a hosted application (e.g., Tubi) that can support a FAST channel, but the second content application may be a hosted application (e.g., Netflix) that does not support the FAST channel. A first content provider (e.g., a FOX Broadcasting Company) may provide the first content item (e.g., FOX News) which is a free service. A second content provider (e.g., Netflix) may provide the second content item (e.g., Netflix Originals) which is not a free service. The user devices 121-123, 201-203 may cause the first content application (e.g., Tubi) to play, provide, or output the first content item (e.g., FOX News). Based on reaching an endpoint of the first content item (e.g., FOX news), the user devices 121-123, 201-203 may cause the second content application (e.g., Netflix) to play, provide, or output the second content item (e.g., Netflix Originals), as described above. In this case, the user devices 121-123, 201-203 (e.g., the player 410) may include additional encryption protection information to play, provide, or output the second content item (e.g., a non-free service channel). The first content item (e.g., a free service channel) may include encryption protection information, but it may be simpler than the additional encryption protection information for the second content item (e.g., a non-free service channel). In another example, the first content application (e.g., Disney+) and the second content application (e.g., Netflix) may be hosted applications that do not support FAST channels (e.g., non-free service channels).

Figure 8:
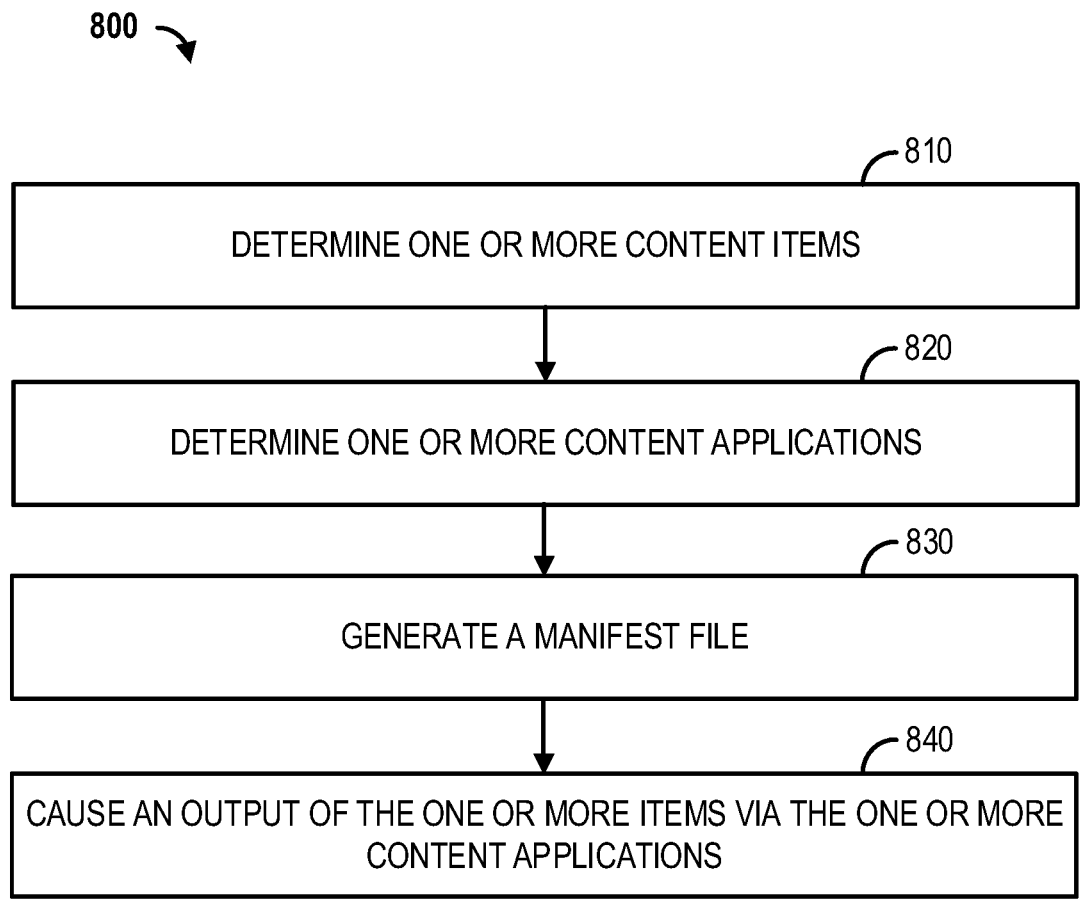
FIG. 8 shows a flowchart of an example method.

FIG. 8 shows an example method 800 for generating a manifest file to select content applications for outputting or providing selected content items. The method 800 may be performed by any device, such as the user device 121-123, 201-203, the aggregator device 128, 206, and the computing device 126. At 810, one or more content items may be determined. For example, the computing device 126 may determine the one or more content items based on a similarity measure. The one or more content items may be associated with a channel (e.g., a linear channel). The channel may be thematic (e.g., a history channel, a food channel, a sports channel, etc.) and the one or more content items may be related to the theme of the channel. The one or more content items may be determined based on the theme of the channel or the similarity between the themes of the content items. At 820, one or more content applications may be determined. For example, the computing device 126 may determine the one or more content applications based on the one or more content items. The one or more content applications may include the one or more content items. For example, the one or more content applications may play, provide, or output the one or more content items. For example, the computing device 126 may receive one or more playlists associated with the one or more content applications from one or more content servers (e.g., the content source 127). Based on the one or more playlists, the computing device 126 may determine that the one or more content applications include or play the one or more content items.

At 830, a manifest file may be generated. For example, the computing device 126 may generate the manifest file based on the one or more content items and the one or more content applications. The manifest file may comprise one or more content item identifiers and one or more content application identifiers. The one or more content item identifiers may indicate the one or more content items. The one or more content item identifiers may be one or more VOD content item identifiers. The one or more content application identifiers may indicate the one or more content applications. For example, the one or more content application identifiers may indicate the one or more content applications (e.g., hosted applications) that can play, provide, or output the one or more content items. Thus, the one or more content item identifiers and the one or more content application identifiers are associated with each other based on the one or more content items.

The one or more content applications may be one or more hosted applications installed in or accessible by the user device 121-123, 201-203. The one or more content application identifiers may comprise at least one of URI, URL, URN, a supplemental property, an SCTE 35 message, or an event that can occur periodically. For example, the user device 121-123, 201-203 (e.g., the player 410) may recognize, based on the manifest file, that the one or more content items are associated with the one or more content applications. The one or more content application identifiers (e.g., one or more supplemental properties) may be inserted at the time of the manifest file creation (e.g., the layout channel manifest creation) and added to each period that represents a particular content set in the channel.

At 840, the one or more content items may be played, provided, or output. For example, the computing device 126 may cause output of the one or more content items via the one or more content applications. The computing device 126 may send the manifest file to the user device 121-123, 201-203. The user device 121-123, 201-203 may determine the one or more content applications to play, provide, or output the one or more content items based on the manifest file. For example, the user device 121-123, 201-203 may display an instruction, prompt, or an option to select the one or more content items through a graphic overlay on a display associated with the user device 121-123, 201-203. The one or more content items may be associated with the one or more content applications. Based on the selection of the one or more content items, the user device 121-123, 201-203 may cause the one or more content applications to play, provide, or output the one or more items.

Figure 9:
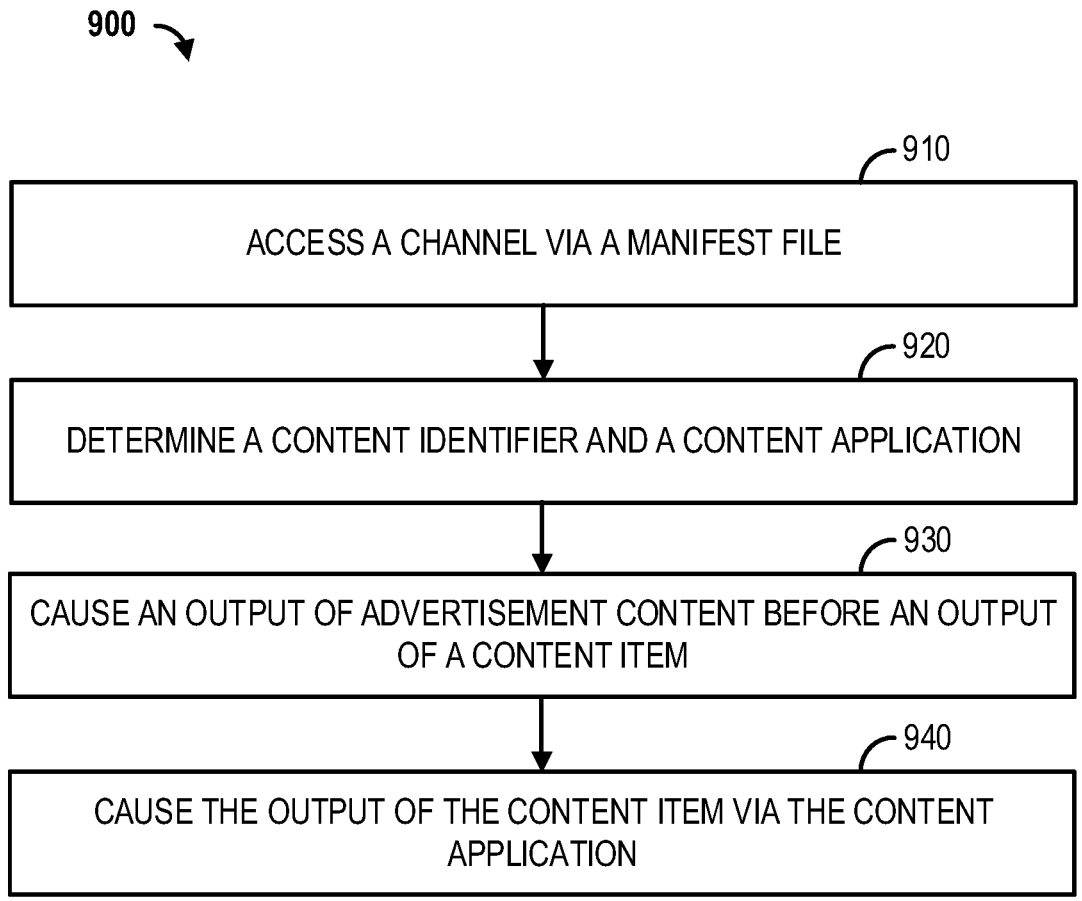
FIG. 9 shows a flowchart of an example method.

FIG. 9 shows an example method 900 for outputting advertisement and content items base on content applications. The method 900 may be performed by any device such as the user device 121-123, 201-203 and/or the computing device 126. At 910, a channel (e.g., a linear channel) may be accessed. For example, the user device 121-123, 201-203 may access the channel based on a manifest file. The user device 121-123, 201-203 may receive the manifest file associated with a channel (e.g., a linear channel) before or during accessing the channel. The manifest file may be received from the computing device 126. The manifest file may comprise one or more content item identifiers and one or more content application identifiers. The one or more content item identifiers may indicate one or more content items associated with the channel. The one or more content application identifiers may indicate one or more content applications associated with the one or more content items. Thus, the one or more content item identifiers and the one or more content application identifiers are associated with each other based on the one or more content items. The one or more content applications may be one or more hosted applications installed in or accessible by the user device 121-123, 201-203. The one or more content application identifiers may be at least one of URIs, URLs, URNs, supplemental properties, SCTE 35 messages, and/or indications of events that can occur periodically.

At 920, a content item identifier and a content application may be determined. For example, the user device 121-123, 201-203 may determine the content item identifier associated with a content item based on a request for the content item. The user device 121-123, 201-203 may also determine the content application to play, provide, or the output the content item based on the content application identifier associated with the content item identifier in the manifest file. At 930, am output of advertisement content may be caused. For example, the user device 121-123, 201-203 may cause an output of the advertisement content based on an advertisement manifest file. For example, the user device 121-123, 201-203 may cause the output of the advertisement content before an output of the content item, based on an advertisement manifest file. The advertisement manifest file may be received from one or more servers (e.g., one or more advertisement servers). The advertisement manifest file may be a part of the manifest file or may be a separate advertisement manifest file. The advertisement manifest file may include one or more advertisement insertion opportunities.

The advertisement content may be played, provided, or output, before, during, or after the content item is played, provided, or output via the content application. For example, the user device 121-123, 201-203 may determine the one or more advertisement insertion opportunities. For example, the user device 121-123, 201-203 may determine the one or more advertisement insertion opportunities during the output of the content item based on the advertisement manifest file. The user device 121-123, 201-203 may pause the output of the content item by the content application based on the one or more advertisement insertion opportunities. The user device 121-123, 201-203 may cause the content application to play, provide, or output the advertisement content.

The advertisement content may be placed by any device (e.g., the user device 121-123, 201-203, the computing device 126, etc.) that controls the creation of the channel or playlist. For example, inside of the content item being played, the advertisement content may be baked into the layout. The advertisement content may be replaced by signals such as an SCTE 35 or a site 224 instruction set. Alternatively or additionally, the advertisement content may be inserted instead of replacing the baked-in advertisement, for example, based on that the timeline of the channel is entirely filled and no gaps exist in the layout.

In another example, the advertisement content may be scheduled or played by the user device 121-123, 201-203 (e.g., the player 410). For example, the user device 121-123, 201-203 (e.g., the player 410) may cause an output of the advertisement content first based on the advertisement manifest file (e.g., Ad MPD) and cause an output of the content item via the determined content application based on the manifest file. The advertisement content may be played, provided, or output during the content item being played, provided or output, or after the content item is completed. The overall time for the content item and the advertisement content may be the same as scheduled for the content item. For example, a 60-minute scheduled slot may comprise 47 minutes to play, provide, or output the content item and 13 minutes to play, provide, or output the advertisement content. The 13 minutes planned for the advertisement content may spread out throughout the 60-minute time slot.

At 940, the content item may be played. For example, based on reaching an endpoint of the advertisement content, the user device 121-123, 201-203 may cause an output of the content item via the content application. The user device 121-123, 201-203 may cause the output of the content item based on the manifest file indicating the association between the content item and the content application that can play, provide, or output the content item. In an example, the advertisement content may be played, provided, or output while the content item is played, provided, or output. The user device 121-123, 201-203 may determine an advertisement insertion opportunity during the output of the content item. Based on the advertisement insertion opportunity, the user device 121-123, 201-203 may pause or stop the output of the content item via the content application and cause an output of the advertisement content. Based on reaching an endpoint of the advertisement content, the user device 121-123, 201-203 may continue an output of the content item via the content application. The advertisement content may be played, provided, or output by the content application or a main player application of the user device 121-123, 201-203.

Figure 10:
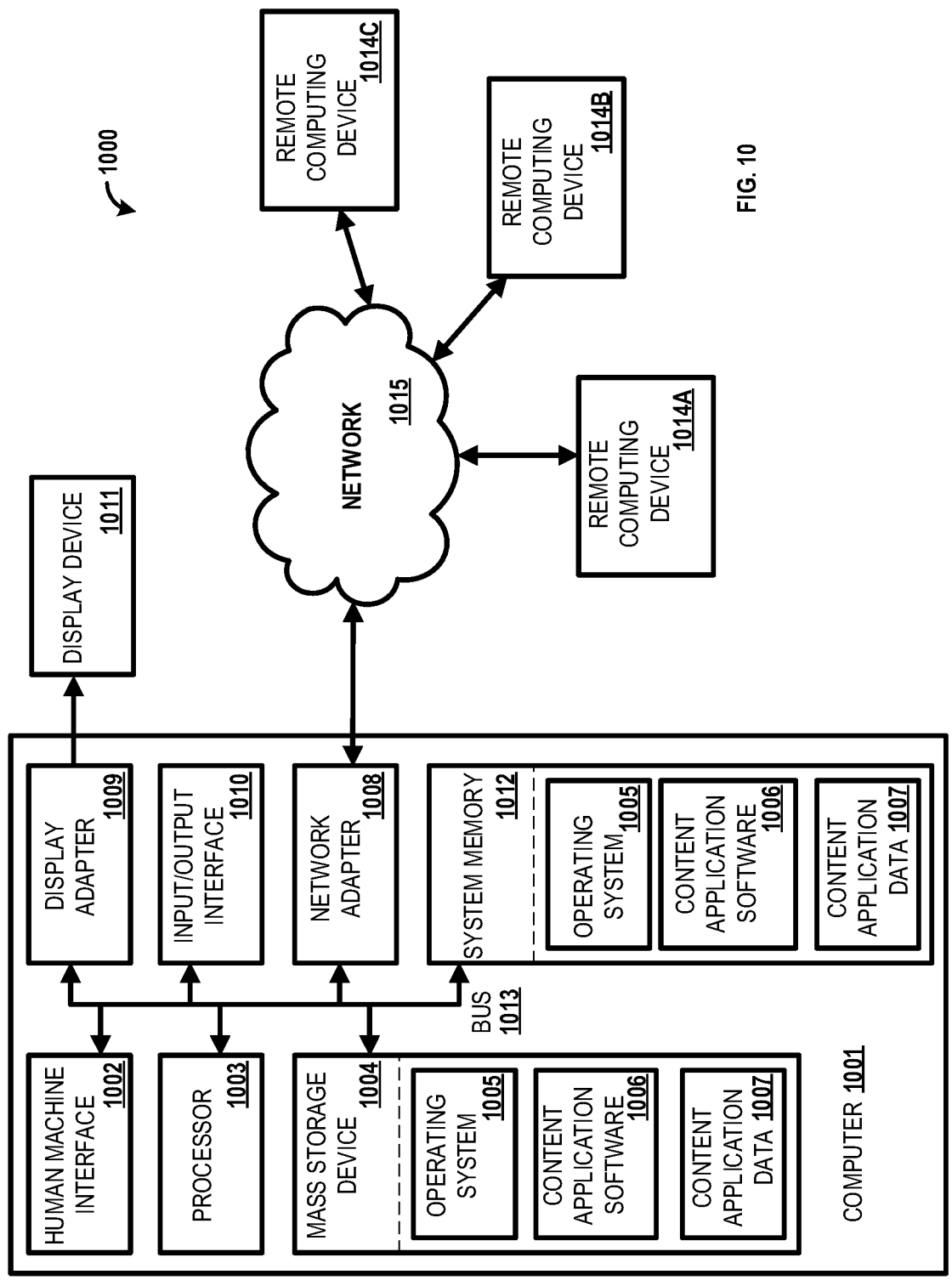
FIG. 10 shows an example system.

FIG. 10 shows an example system 1000 for selecting content applications for outputting or providing selected content items. The user device 121-123, the computing device 126, the content source 127, and/or the aggregator device 128 of FIG. 1 may be a computer 1001 as shown in FIG. 10. The user device 201-203, the origin 204, the packager 205, and/or the aggregator 206 of FIG. 2 may be a computer 1001 as shown in FIG. 10. The computer 1001 may include one or more processors 1003, a system memory 1012, and a bus 1013 that couples various system components including the one or more processors 1003 to the system memory 1012. In the case of multiple processors 1003, the computer 1001 may utilize parallel computing. The bus 1013 is one or more of several possible types of bus structures, including a memory bus or memory controller, a peripheral bus, an accelerated graphics port, or local bus using any of a variety of bus architectures.

The computer 1001 may operate on and/or include a variety of computer readable media (e.g., non-transitory). The readable media may be any available media that is accessible by the computer 1001 and may include both volatile and non-volatile media, removable and non-removable media. The system memory 1012 has computer readable media in the form of volatile memory, such as random access memory (RAM), and/or non-volatile memory, such as read only memory (ROM). The system memory 1012 may store data such as the audio data 1007 and/or program modules such as the operating system 1005 and the noise reduction software 1006 that are accessible to and/or are operated on by the one or more processors 1003.

The computer 1001 may also have other removable/non-removable, volatile/non-volatile computer storage media.

FIG. 10 shows the mass storage device 1004 which may provide non-volatile storage of computer code, computer readable instructions, data structures, program modules, and other data for the computer 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and/or the like.

Any quantity of program modules may be stored on the mass storage device 1004, such as the operating system 1005 and the content application software 1006. Each of the operating system 1005 and the content application software 1006 (or some combination thereof) may include elements of the program modules and the content application software 1006. The operating system 1005 and the content application software 1006 (or some combination thereof) may perform the methods described in FIGS. 4-9. The content application data 1007 may also be stored on the mass storage device 1004. The content application data 1007 may be stored in any of one or more databases known in the art. Such databases may be DB2®, Microsoft® Access, Microsoft® SQL Server, Oracle®, MySQL, PostgreSQL, and/or the like. The databases may be centralized or distributed across locations within the network 1015.

A user may enter commands and information into the computer 1001 via an input device (not shown). Examples of such input devices include, but are not limited to, a keyboard, pointing device (e.g., a computer mouse, remote control), a microphone, a joystick, a scanner, tactile input devices such as gloves, and other body coverings, motion sensor, and/or the like These and other input devices may be connected to the one or more processors 1003 via a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

The display device 1011 may also be connected to the bus 1013 via an interface, such as the display adapter 1009. It is contemplated that the computer 1001 may include more than one display adapter 1009 and the computer 1001 may include more than one display device 1011. The display device 1011 may be a monitor, an LCD (Liquid Crystal Display), light emitting diode (LED) display, television, smart lens, smart glass, and/or a projector. In addition to the display device 1011, other output peripheral devices may be components such as speakers (not shown) and a printer (not shown) which may be connected to the computer 1001 via the Input/Output Interface 1010. Any step and/or result of the methods may be output (or caused to be output) in any form to an output device. Such output may be any form of visual representation, including, but not limited to, textual, graphical, animation, audio, tactile, and/or the like. The display device 1011 and computer 1001 may be part of one device, or separate devices.

The computer 1001 may operate in a networked environment using logical connections to one or more remote computing devices 1014a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1001 and a remote computing device 1014a,b,c may be made via a network 1015, such as a local area network (LAN) and/or a general wide area network (WAN). Such network connections may be through the network adapter 1008. The network adapter 1008 may be implemented in both wired and wireless environments. Such networking environments are conventional and commonplace in dwellings, offices, enterprise-wide computer networks, intranets, and the Internet.

Application programs and other executable program components such as the operating system 1005 are shown herein as discrete blocks, although it is recognized that such programs and components reside at various times in different storage components of the computing device 1001, and are executed by the one or more processors 1003 of the computer. An implementation of the content application software 1006 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as examples only, with a true scope and spirit being indicated by the following claims.

What is claimed is:

1. A method comprising:
   receiving, by a computing device, a manifest file associated with a channel, wherein the manifest file comprises one or more content item identifiers indicative of one or more content items associated with the channel and one or more content application identifiers indicative of one or more content applications associated with the one or more content items;
   determining, based on the one or more content item identifiers and the one or more content application identifiers, the one or more content applications to provide the one or more content items; and
   causing display of the one or more content items via the one or more content applications.

2. The method of claim 1, wherein the one or more content applications are one or more hosted applications accessible to the computing device.

3. The method of claim 1, wherein the one or more content application identifiers comprises at least one of a Uniform Resource Identifier (URI) or a supplemental property.

4. The method of claim 1, wherein determining the one or more content applications to provide the one or more content items further comprises:
  causing output of an option to select at least a portion of a content item of the one or more content items, wherein the content item is associated with a content application of the one or more content applications.

5. The method of claim 4, further comprising:
  receiving the selection indicative of the portion of the content item; and
  sending, based on the content application associated with the selected portion of the content item, the selection to provide the content item via the content application.

6. The method of claim 5, wherein the portion of the content item is the same or a subsequent portion of the content item being output by the channel.

7. The method of claim 1, wherein determining the one or more content applications to provide the one or more content items further comprises:
  determining a first content item of the one or more content items, wherein the first content item is currently being output by the channel; and
  causing, based on the first content item reaching an endpoint on the channel, output of an option to select a second content item to be output by a content application of the one or more content applications, wherein the second content item is associated with the first content item.

8. The method of claim 7, wherein the option to select the second content item is displayed via a graphic overlay.

9. The method of claim 1, wherein determining the one or more content applications to provide the one or more content items further comprises:
  displaying a playlist comprising the one or more content items;
  receiving a selection indicative of a content item of the one or more content items, wherein the content item is associated with a content application of the one or more content applications; and
  sending the selection to the content application to cause an output of the content item.

10. The method of claim 1, wherein the computing device is a set-top box.

11. A method comprising:
  receiving, by a computing device, a manifest file associated with a channel, wherein the manifest file comprises one or more content item identifiers indicative of one or more content items associated with the channel and one or more content application identifiers indicative of one or more content applications associated with the one or more content items;
  causing output of an option to select a content item of the one or more content items to be output by a content application of the one or more content applications;
  determining, based on a content application identifier associated with the content application, the content application to provide the content item; and
  causing output of the content item via the content application.

12. The method of claim 11, wherein the content item is associated with a content item identifier of the one or more content item identifiers and the content application is associated with the content application identifier of the one or more content application identifiers.

13. The method of claim 11, wherein the one or more content applications are one or more hosted applications accessible by the computing device.

14. The method of claim 11, wherein the option to select the content item is displayed via a graphic overlay.

15. The method of claim 14, wherein the graphic overlay comprises a playlist of the one or more content items.

16. A method comprising:
  receiving, by a computing device, a manifest file associated with a channel, wherein the manifest file comprises: a plurality of content item identifiers indicative of a plurality of content items, and a plurality of content application identifiers indicative of a plurality of content applications;
  determining, based on a first content item identifier of the plurality of content item identifiers and a first content application identifier of the plurality of content application identifiers, a first content application to provide a first content item; and
  determining, based on reaching an endpoint of the first content item, and based on a second content item identifier of the plurality of content item identifiers and a second content application identifier of the plurality of content application identifiers, a second content application to provide a second content item.

17. The method of claim 16, wherein the first content application is a first Free Ad-Supported Television (FAST) channel application and the second content application is a second FAST channel application.

18. The method of claim 16, wherein the first content application is a Free Ad-Supported Television (FAST) channel application and the second content application is a non-FAST channel application.

19. The method of claim 16, wherein the first content item is provided by a first content provider and the second content item is provided by a second content provider, wherein the first content provider and the second content provider are different.

20. The method of claim 16, further comprising:
  causing output of an option to select the second content item to be output by the second content application, wherein the option to select the second content item is displayed via a graphic overlay on a display device; and
  receiving, based on a user input, a selection of the second content item.

21. One or more non-transitory computer-readable storage media comprising processor-executable instructions that, when executed by one or more processors, cause the one or more processors to:
  receive a manifest file associated with a channel, wherein the manifest file comprises: one or more content item identifiers indicative of one or more content items associated with the channel, and one or more content application identifiers indicative of one or more content applications associated with the one or more content items;
  determine, based on the one or more content item identifiers and the one or more content application identifiers, the one or more content applications to provide the one or more content items; and
  cause display of the one or more content items via the one or more content applications.

22. The one or more non-transitory computer-readable storage media of claim 21, wherein at least one of:
  the one or more content applications are one or more hosted applications accessible to a computing device comprising the one or more processors; or the one or more content application identifiers comprises at least one of a Uniform Resource Identifier (URI) or a supplemental property.

23. The one or more non-transitory computer-readable storage media of claim 21, wherein the processor-executable instructions that cause the one or more processors to determine the one or more content applications to provide the one or more content items further cause the one or more processors to:
  cause output of an option to select at least a portion of a content item of the one or more content items, wherein the content item is associated with a content application of the one or more content applications;
  receive a selection indicative of the portion of the content item; and
  send, based on the content application associated with the selected portion of the content item, the selection to provide the content item via the content application.

24. The one or more non-transitory computer-readable storage media of claim 23, wherein the portion of the content item is a same or a subsequent portion of the content item being output by the channel.

25. The one or more non-transitory computer-readable storage media of claim 21, wherein the processor-executable instructions that cause the one or more processors to determine the one or more content applications to provide the one or more content items further cause the one or more processors to:
  determine a first content item of the one or more content items, wherein the first content item is currently being output by the channel; and
  cause, based on the first content item reaching an endpoint on the channel, output of an option to select a second content item to be output by a content application of the one or more content applications, wherein the second content item is associated with the first content item.

26. The one or more non-transitory computer-readable storage media of claim 21, wherein the processor-executable instructions that cause the one or more processors to determine the one or more content applications to provide the one or more content items further cause the one or more processors to:
  display a playlist comprising the one or more content items;
  receive a selection indicative of a content item of the one or more content items, wherein the content item is associated with a content application of the one or more content applications; and
  send the selection to the content application to cause an output of the content item.

27. An apparatus comprising:
  one or more processors; and
  memory storing processor-executable instructions that, when executed by the one or more processors, cause the apparatus to:
    receive a manifest file associated with a channel, wherein the manifest file comprises: one or more content item identifiers indicative of one or more content items associated with the channel, and one or more content application identifiers indicative of one or more content applications associated with the one or more content items;
    determine, based on the one or more content item identifiers and the one or more content application identifiers, the one or more content applications to provide the one or more content items; and
    cause display of the one or more content items via the one or more content applications.

28. The apparatus of claim 27, wherein at least one of:
  the one or more content applications are one or more hosted applications accessible to a computing device comprising the one or more processors; or the one or more content application identifiers comprises at least one of a Uniform Resource Identifier (URI) or a supplemental property.

29. The apparatus of claim 27, wherein the processor-executable instructions that cause the apparatus to determine the one or more content applications to provide the one or more content items further cause the apparatus to:
  cause output of an option to select at least a portion of a content item of the one or more content items, wherein the content item is associated with a content application of the one or more content applications:
  receive a selection indicative of the portion of the content item; and
  send, based on the content application associated with the selected portion of the content item, the selection to provide the content item via the content application.

30. The apparatus of claim 29, wherein the portion of the content item is thea same or a subsequent portion of the content item being output by the channel.

31. The apparatus of claim 27, wherein the processor-executable instructions that cause the apparatus to determine the one or more content applications to provide the one or more content items further cause the apparatus to:
  determine a first content item of the one or more content items, wherein the first content item is currently being output by the channel; and
  cause, based on the first content item reaching an endpoint on the channel, output of an option to select a second content item to be output by a content application of the one or more content applications, wherein the second content item is associated with the first content item.

32. The apparatus of claim 27, wherein the processor-executable instructions that cause the apparatus to determine the one or more content applications to provide the one or more content items further cause the apparatus to:
  display a playlist comprising the one or more content items;
  receive a selection indicative of a content item of the one or more content items, wherein the content item is associated with a content application of the one or more content applications; and
  send the selection to the content application to cause an output of the content item.

* * * * *